United States Patent [19]
Baker et al.

[11] Patent Number: 5,471,817
[45] Date of Patent: Dec. 5, 1995

[54] BAG FOLDING SYSTEM

[75] Inventors: William F. Baker, Scottsdale; Robert A. Rhinefrank, Phoenix; Larry P. Hulsey, Peoria, all of Ariz.

[73] Assignee: Automated Solutions Inc., Phoenix, Ariz.

[21] Appl. No.: 203,801

[22] Filed: Mar. 1, 1994

Related U.S. Application Data

[63] Continuation-in-part of Ser. No. 44,820, Apr. 7, 1993, Pat. No. 5,375,393.

[51] Int. Cl.[6] .................................................. B65B 63/04
[52] U.S. Cl. .............................. 53/429; 53/117; 53/120; 493/405; 493/451; 493/940
[58] Field of Search ....................... 280/731, 732, 280/743; 493/405, 407, 411, 451, 456, 457, 940; 53/117, 120, 429

[56] References Cited

U.S. PATENT DOCUMENTS 4,718,884   1/1988   Iwdse et al. ........................ 493/451

*Primary Examiner*—W. Donald Bray
*Attorney, Agent, or Firm*—Parsons & Associates; Don J. Flickinger; Robert A. Parsons

[57] ABSTRACT

An automated system is disclosed for folding vehicle air bags so that a small folded bag profile in a desirable bag deployment pattern results. A machine having a holding fixture for receiving the retainer of an air bag assembly, and a plurality of upright members. A flattened bag with pleated sides is supported above the upright members, and sequentially inserted between the upright members forming undulating folds. The upright members are removed while retaining the undulating folds. The folds are then compressed, sharpening the folds and forming a compact package. The machine also includes an inserter assembly which inserts the folded bag into the retainer.

9 Claims, 13 Drawing Sheets

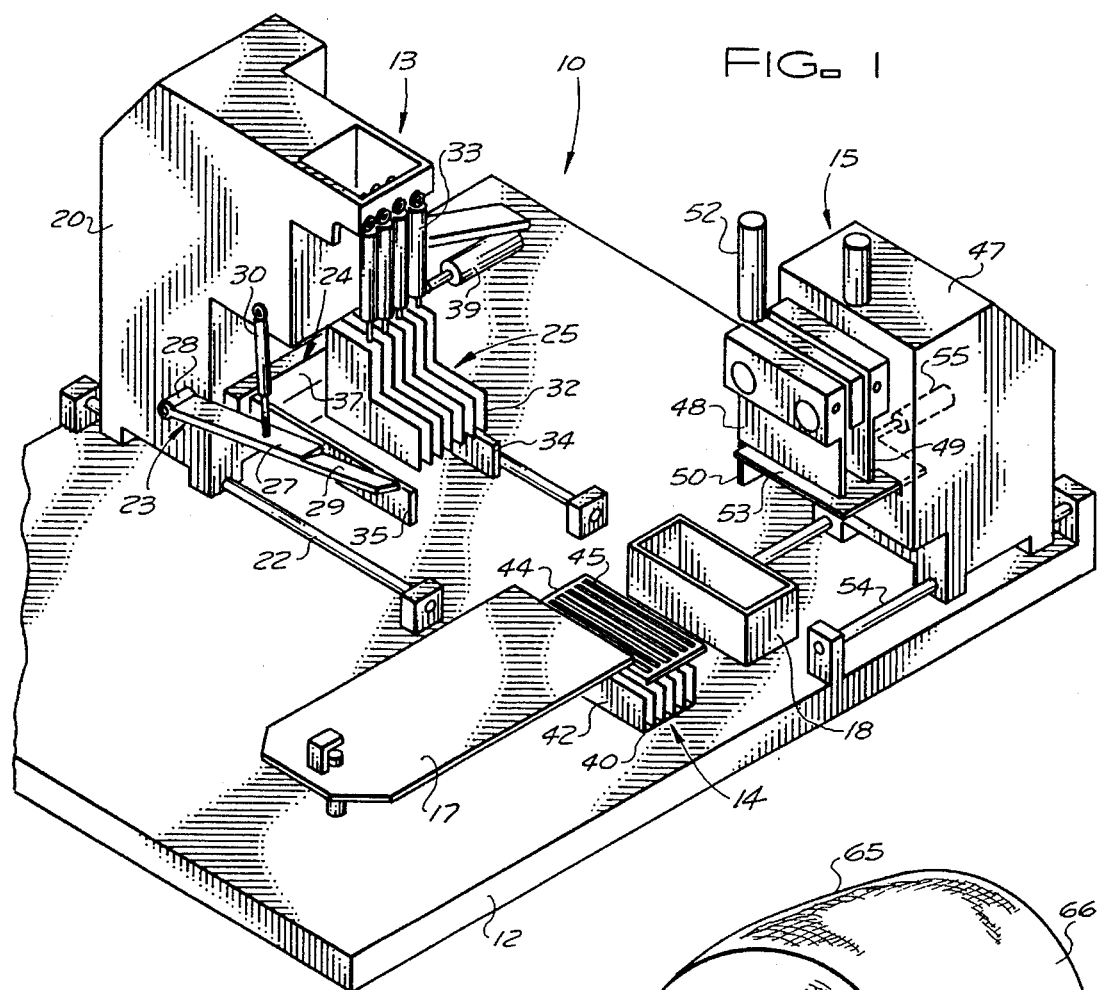
FIG. 1
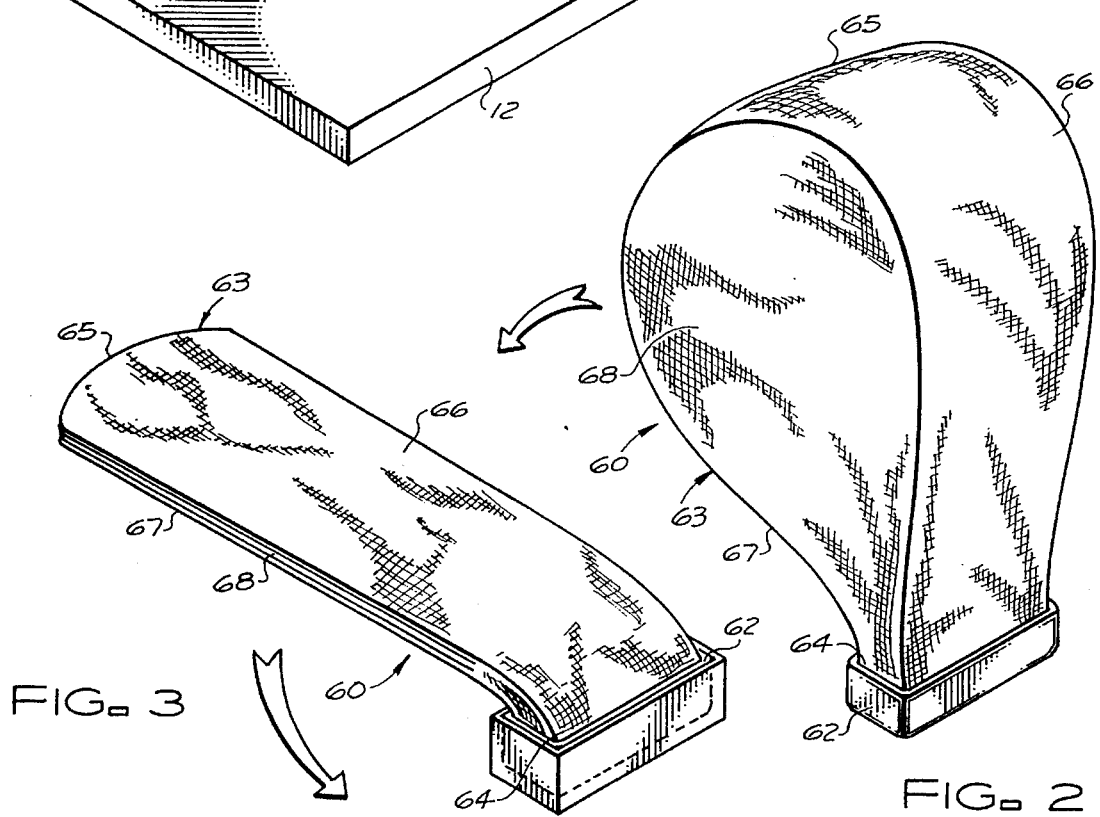
FIG. 3
FIG. 2

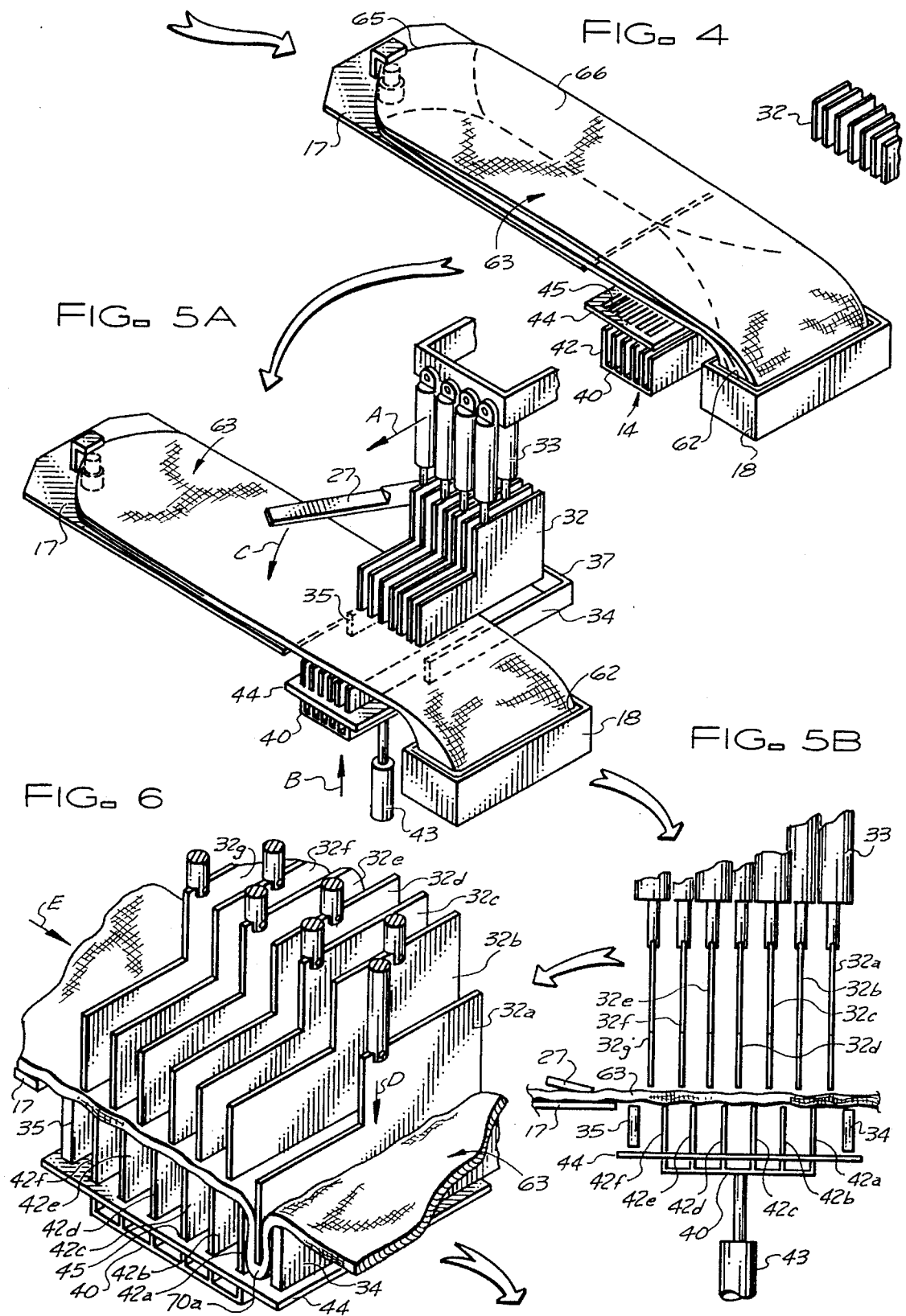

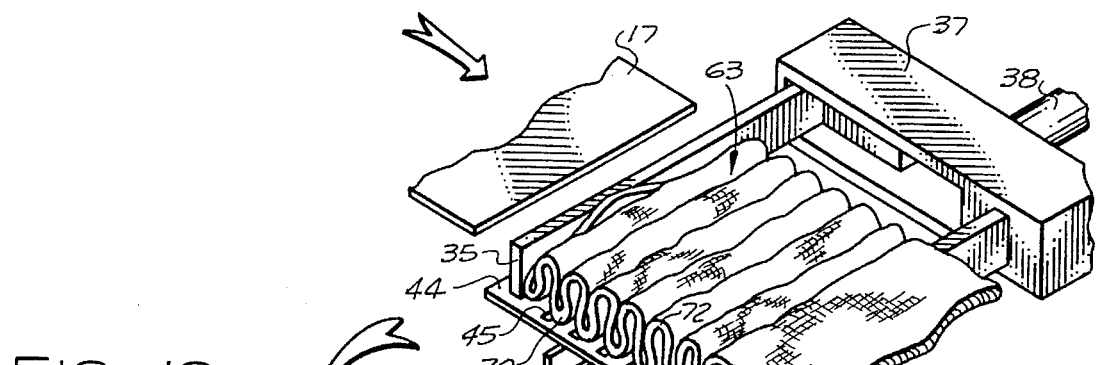
FIG. 11
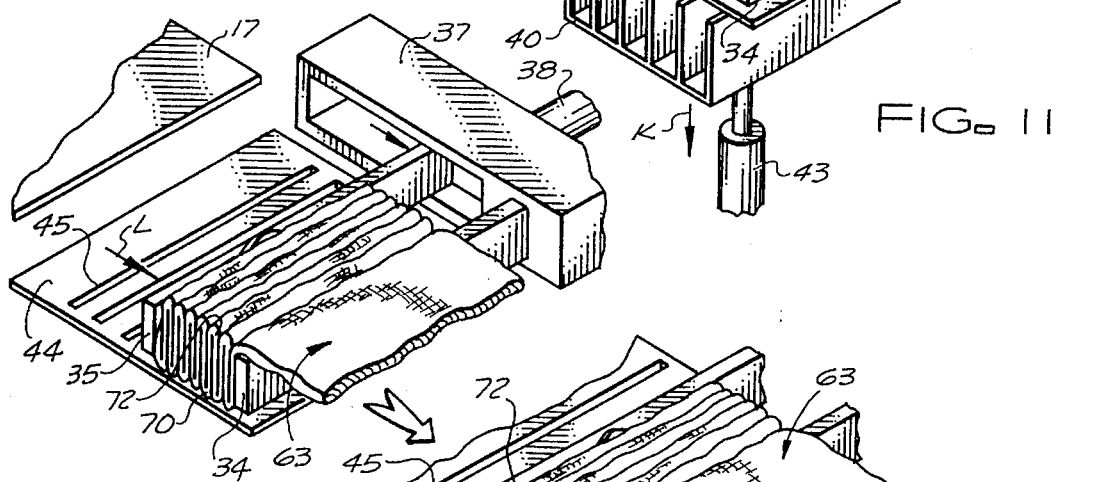
FIG. 12
FIG. 13
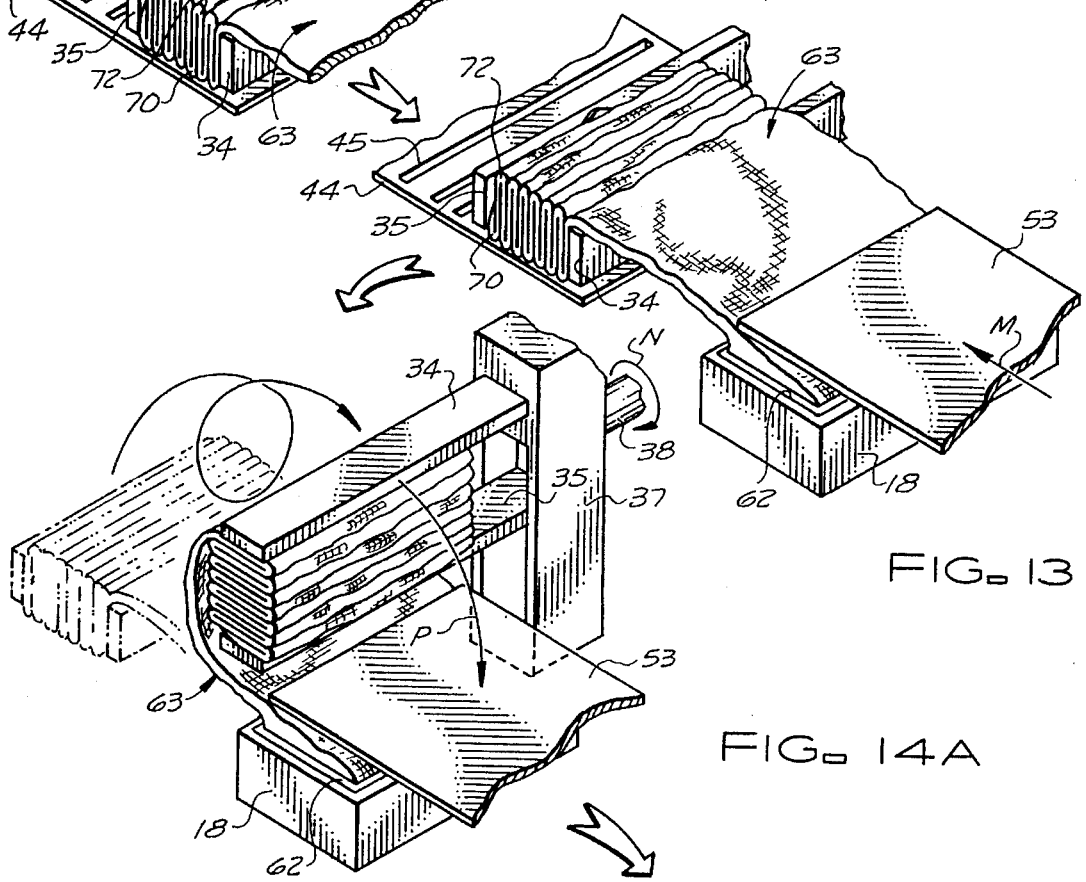
FIG. 14A

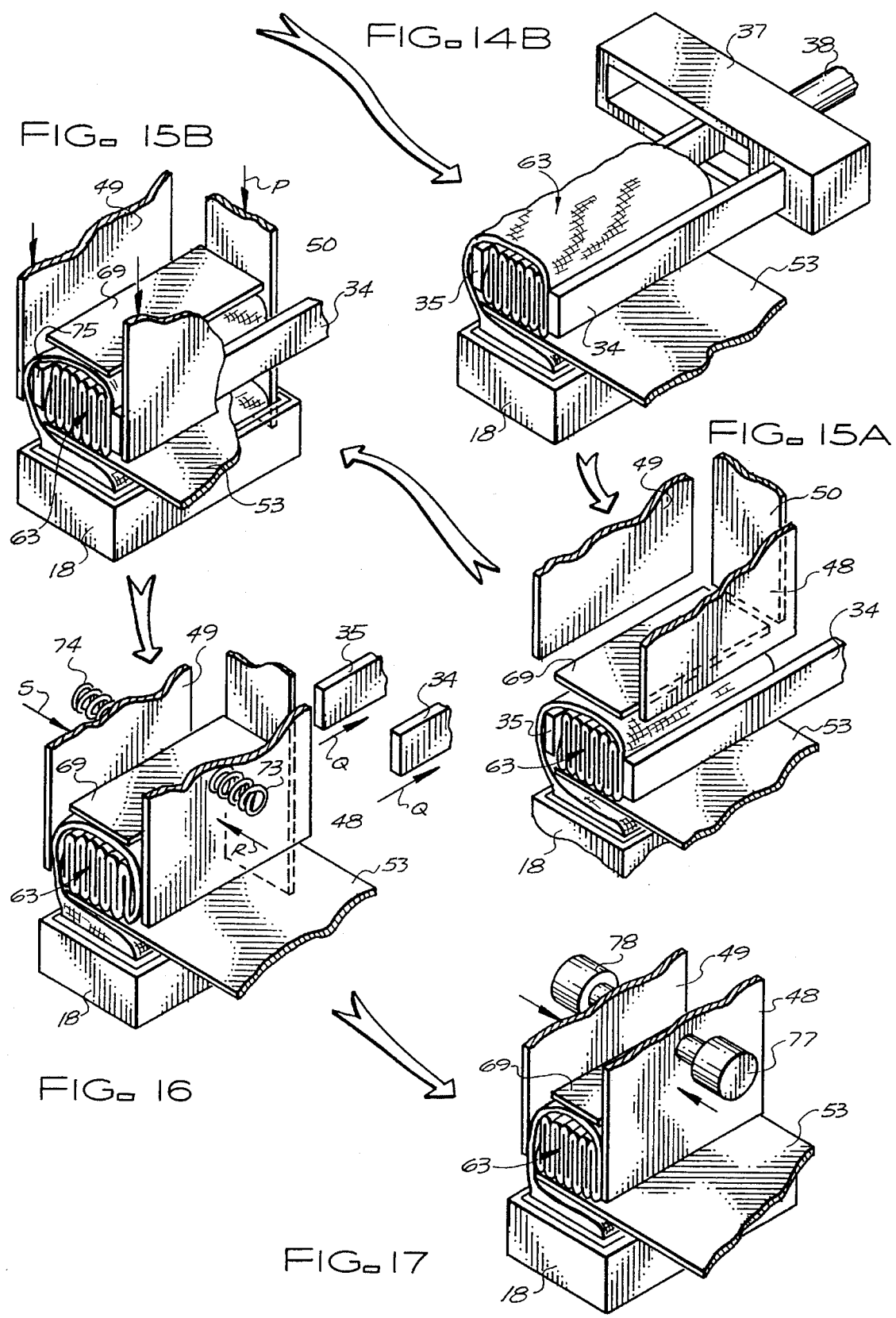

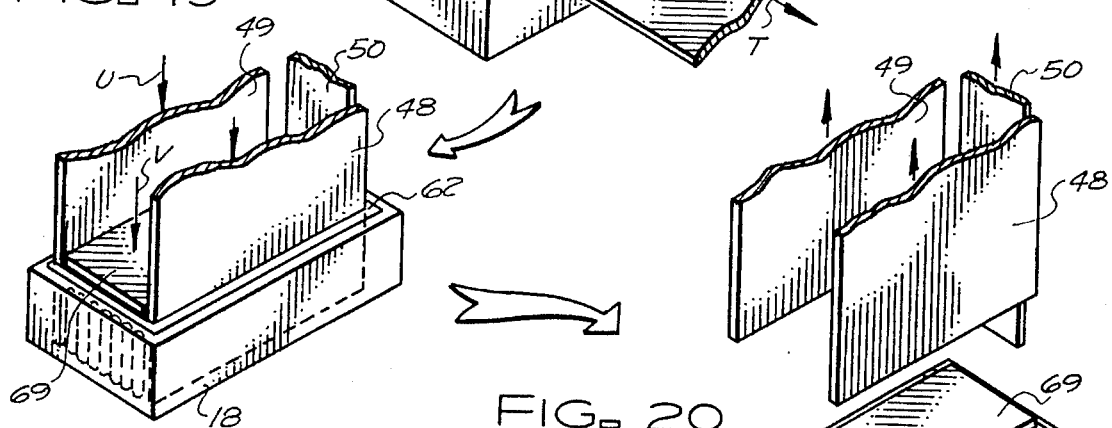
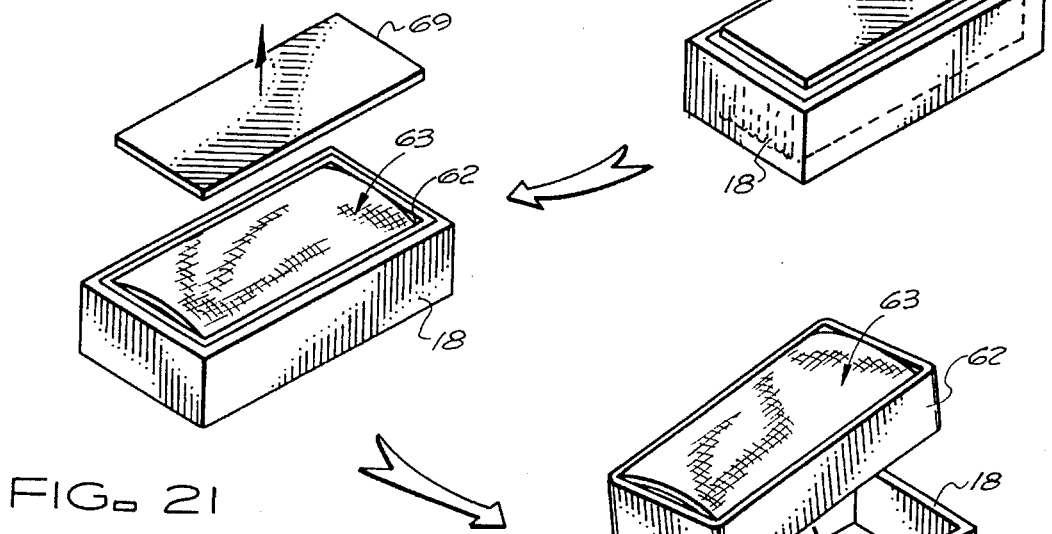

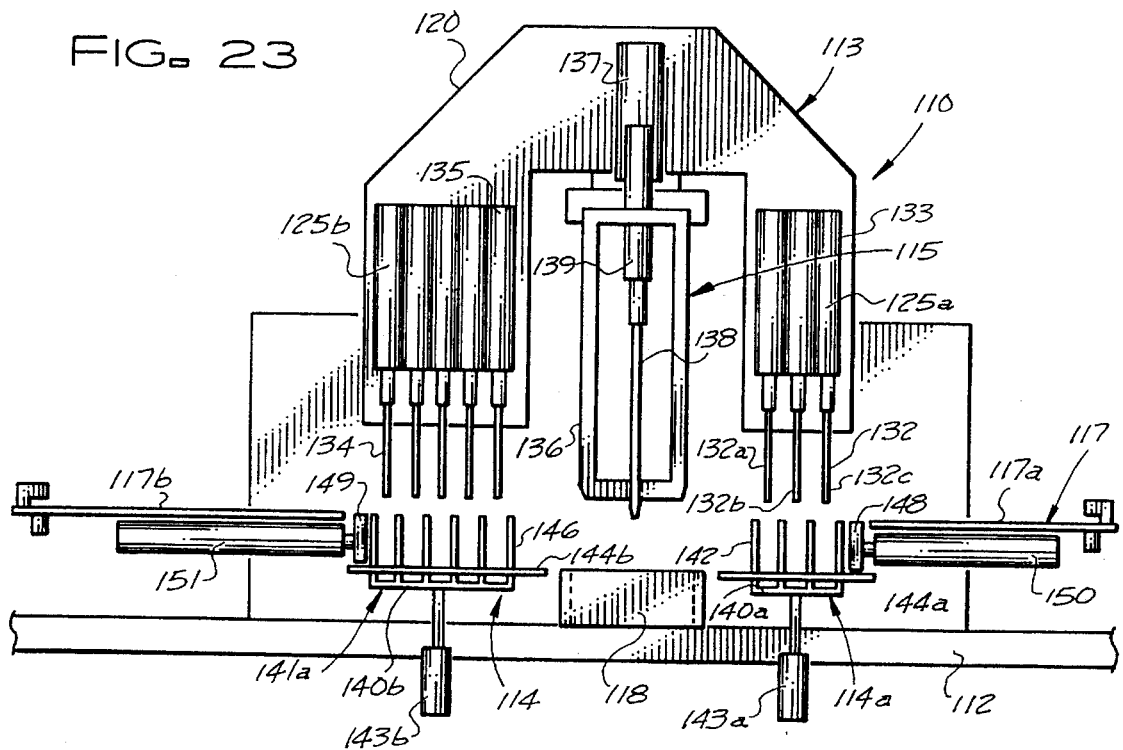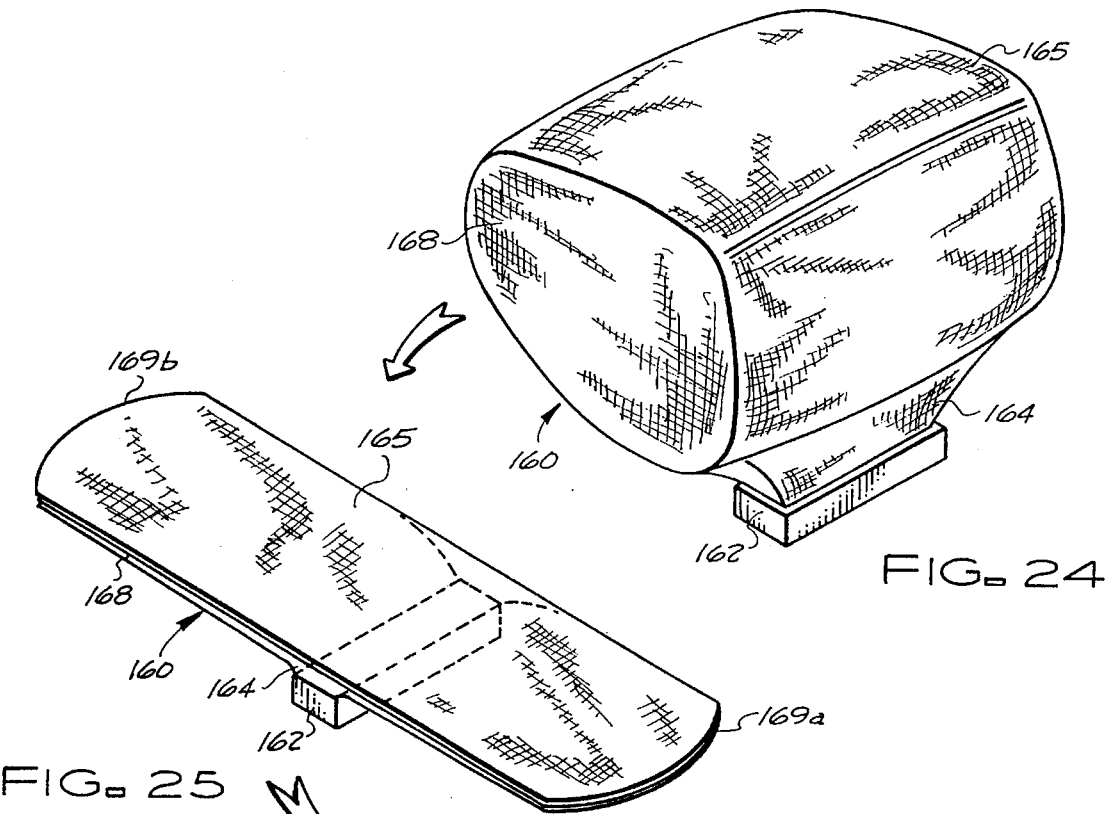

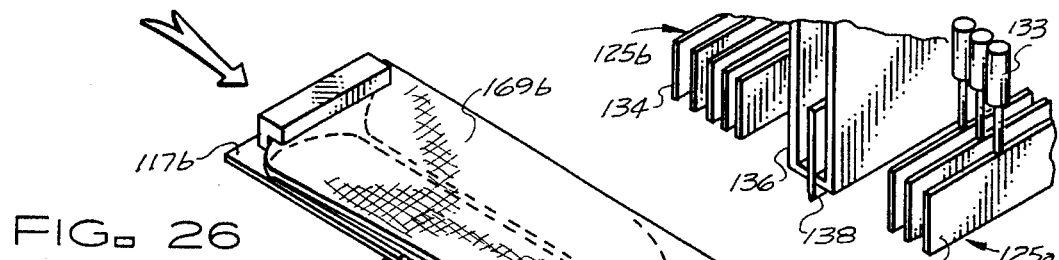
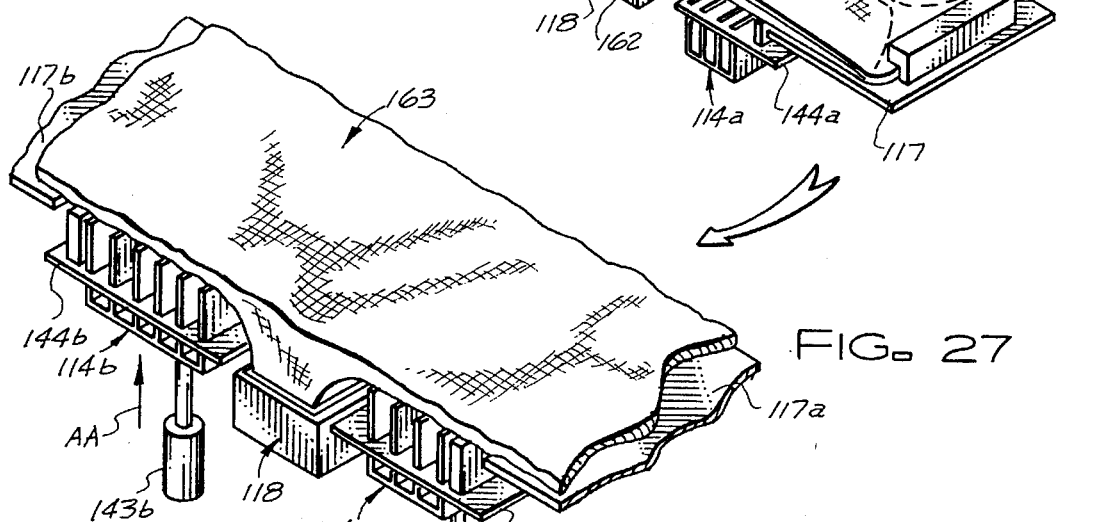
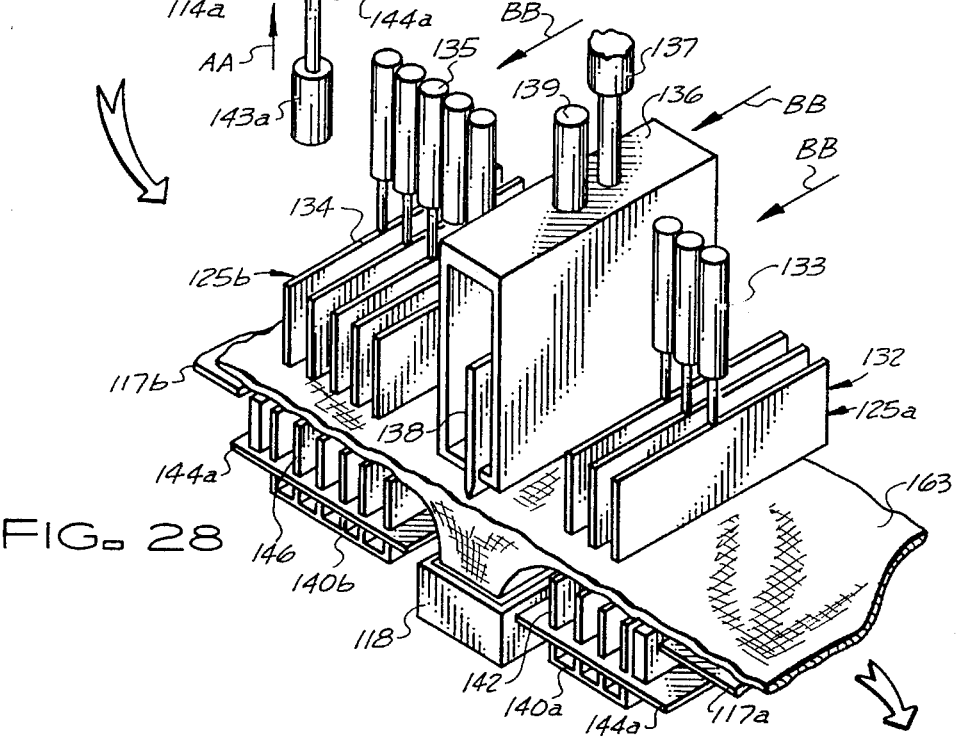

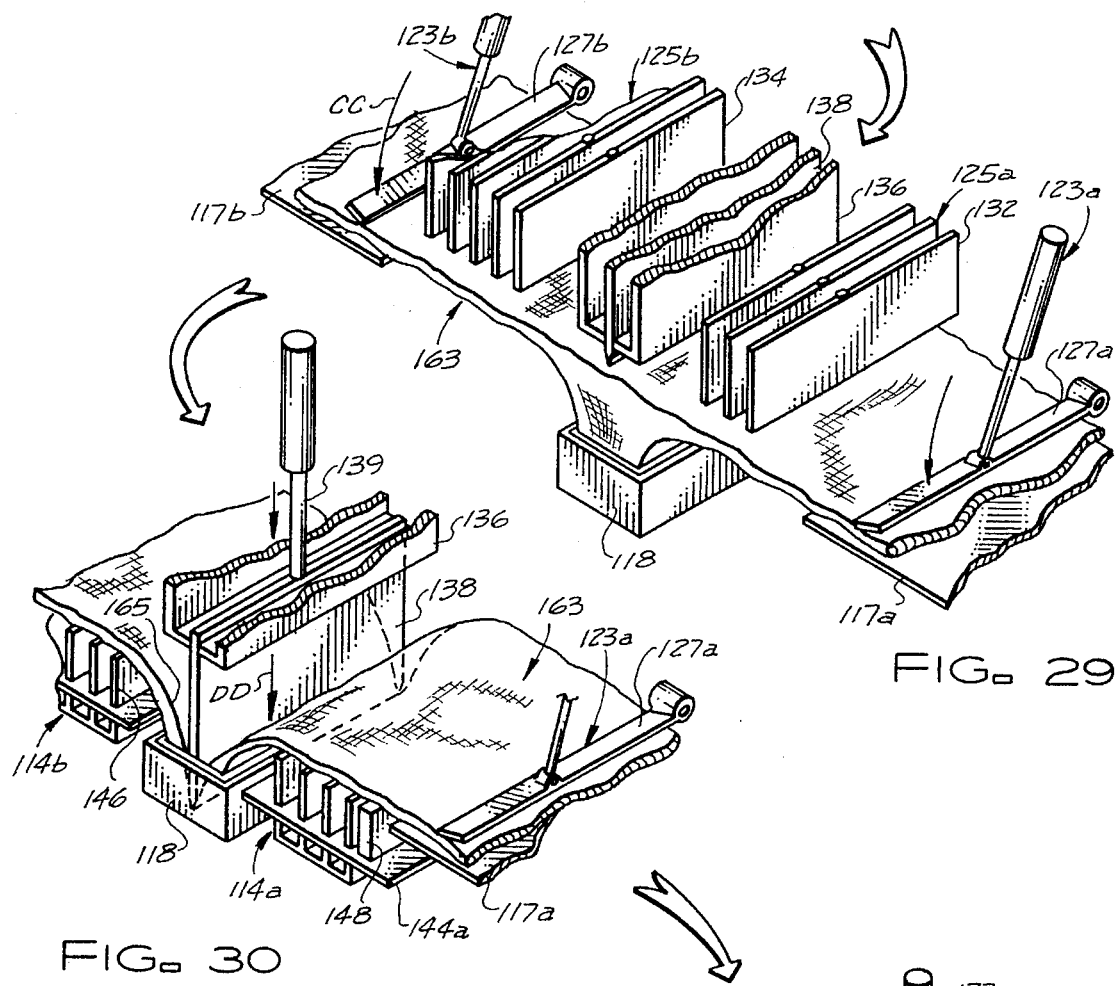
FIG. 29
FIG. 30
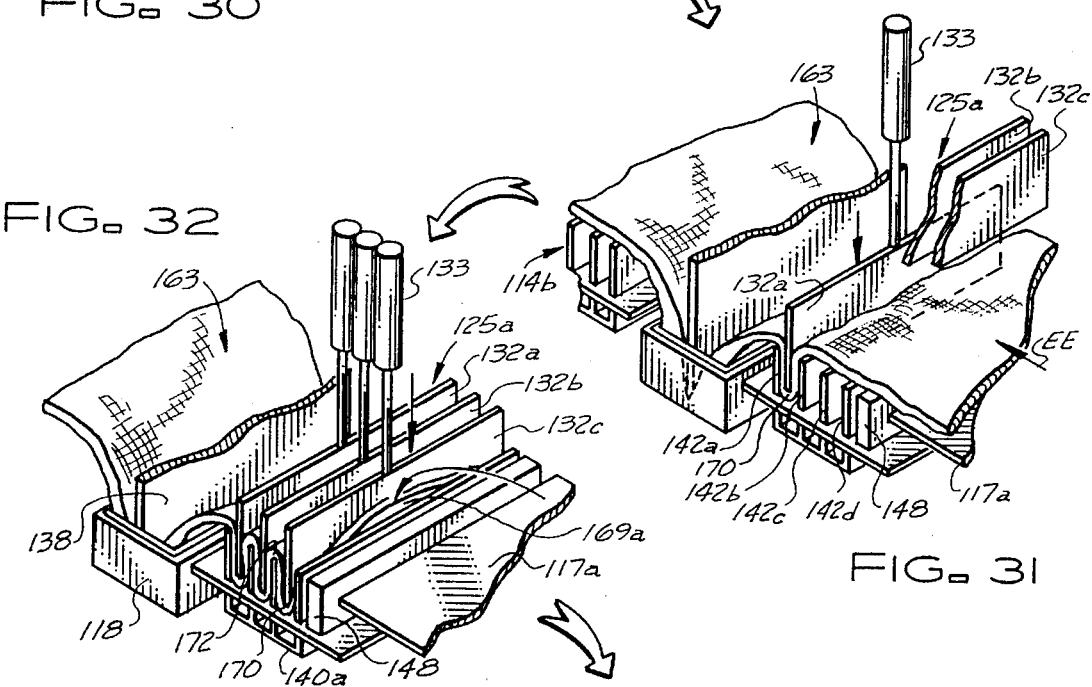
FIG. 32
FIG. 31

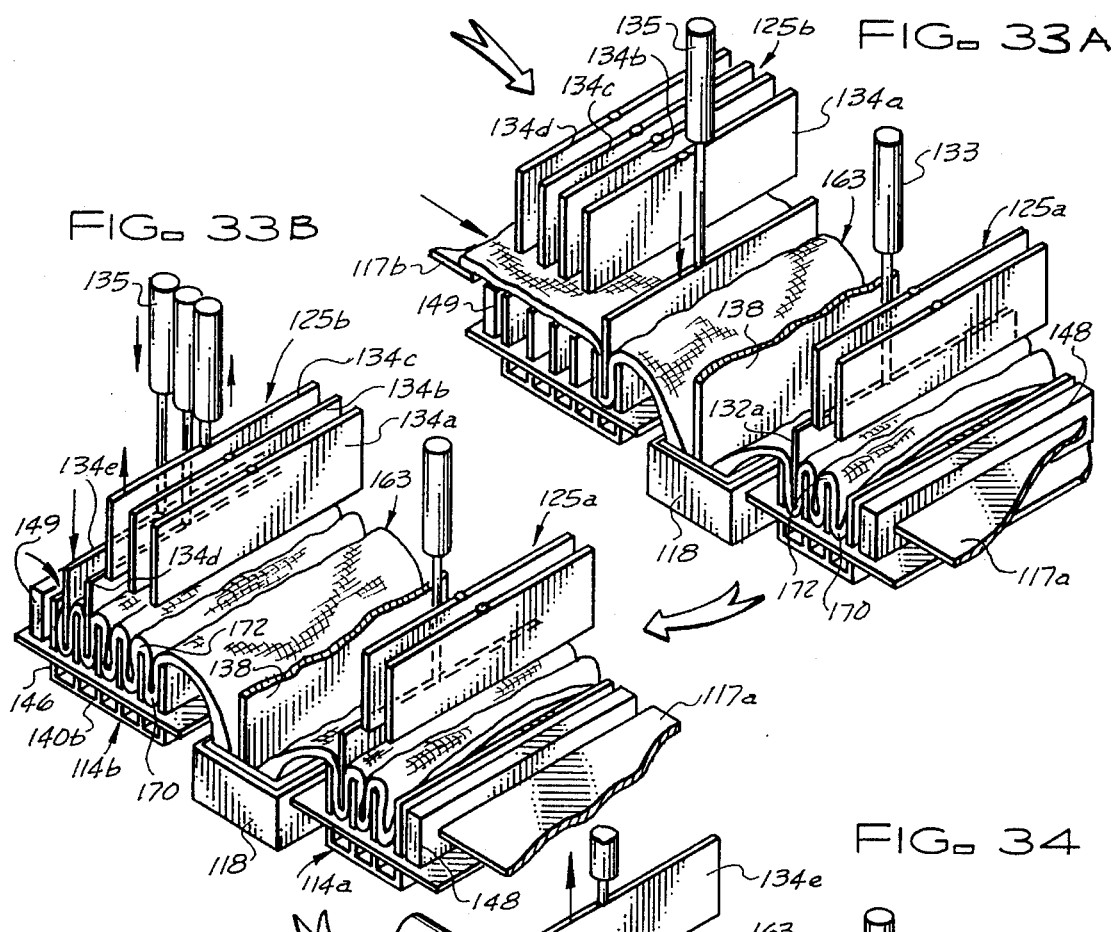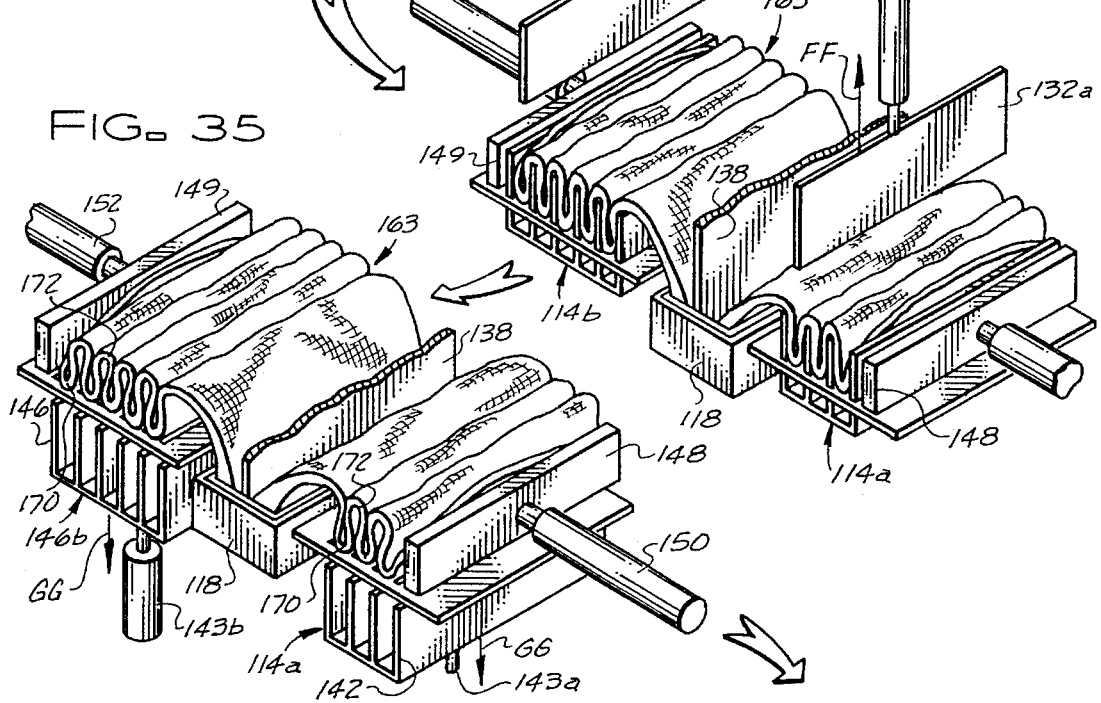

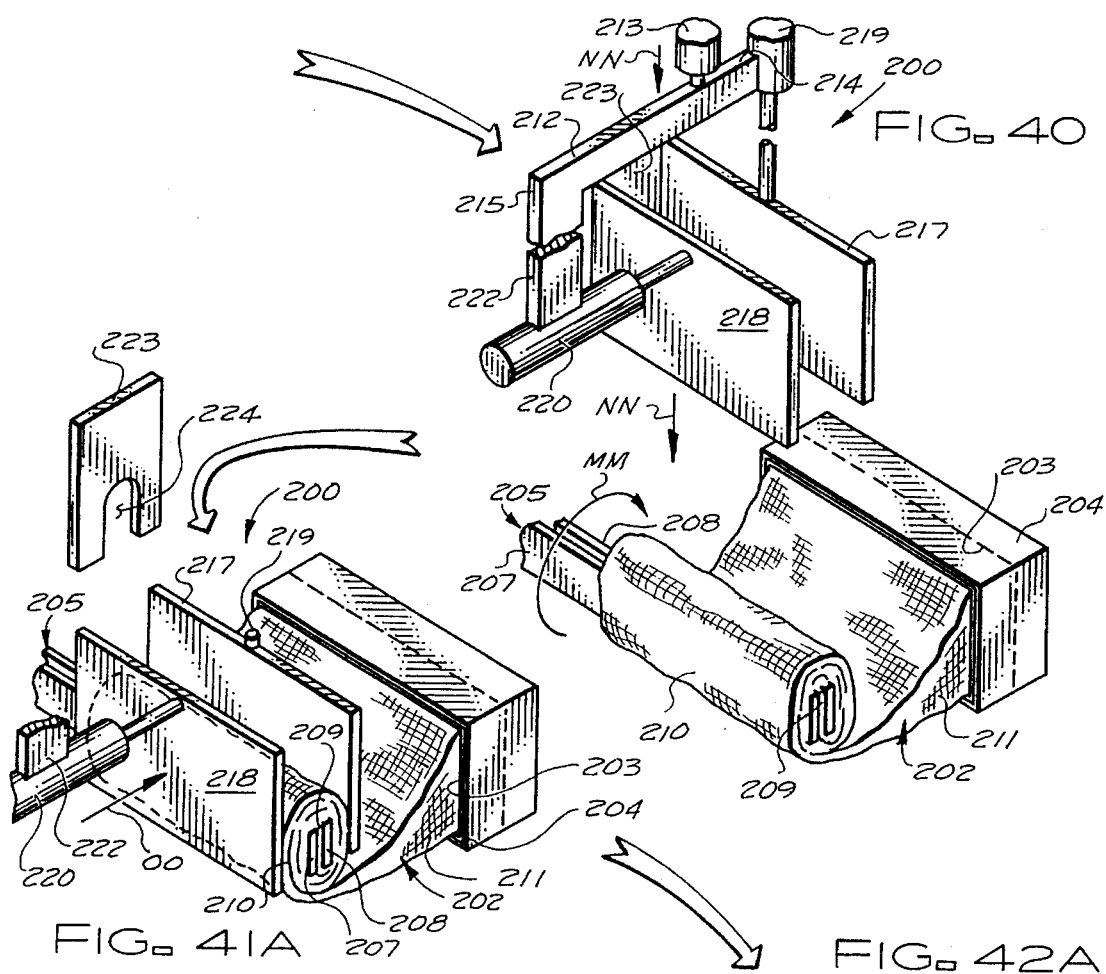
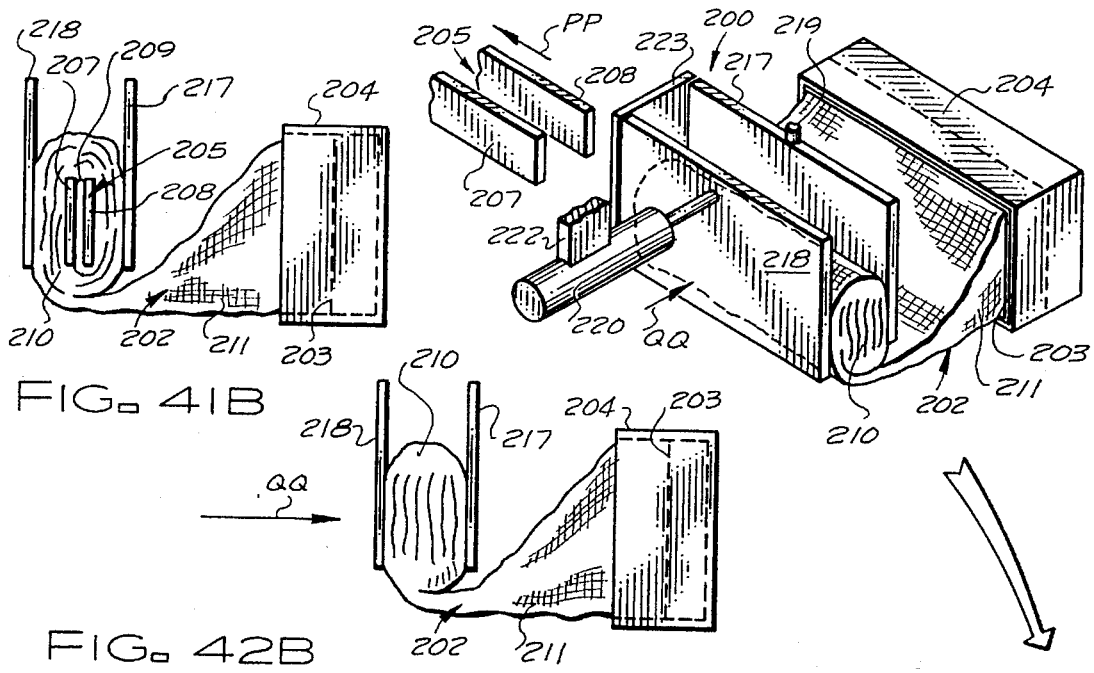

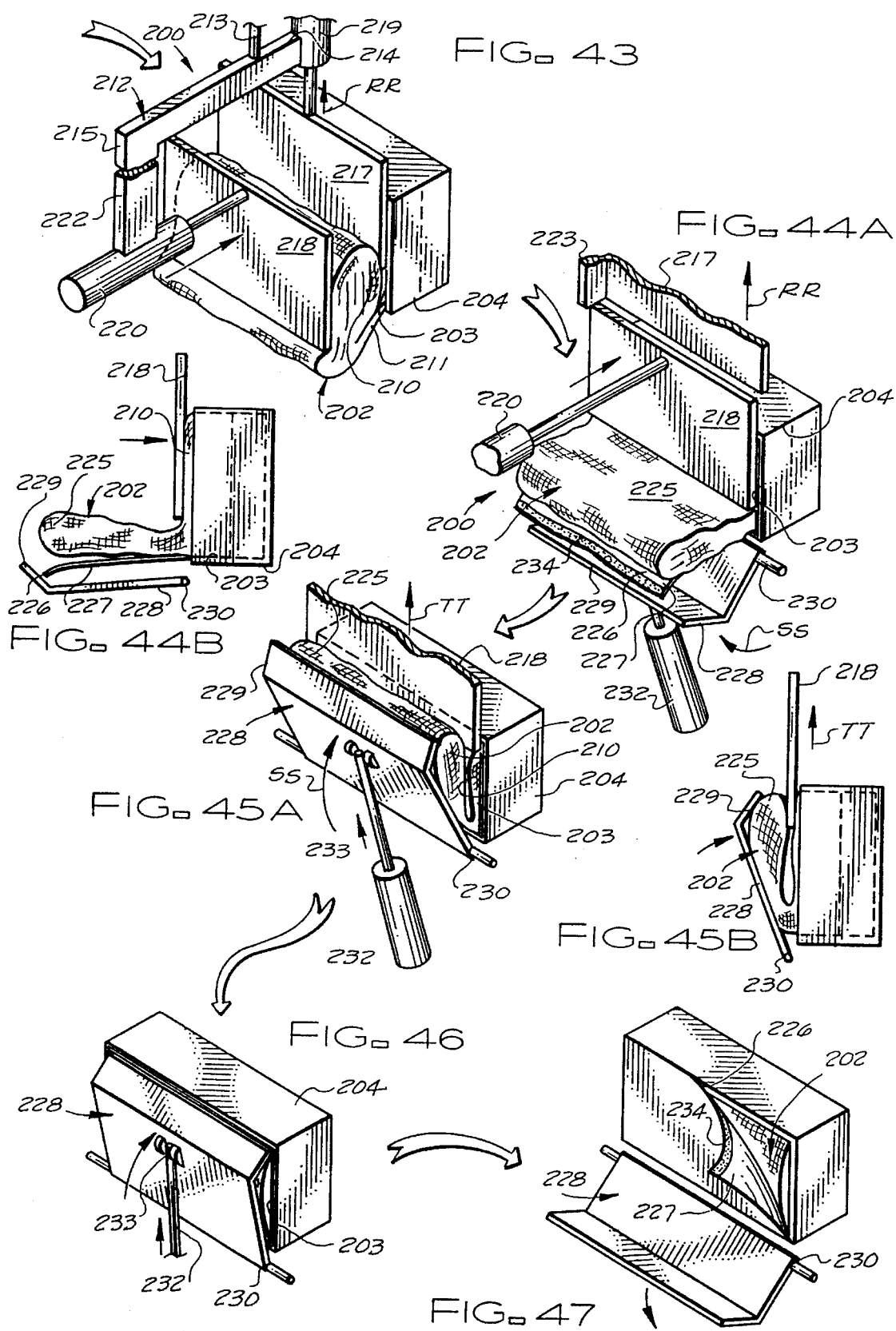

BAG FOLDING SYSTEM

This application is a Continuation-in-Part of prior application Ser. No. 08/044,820, filed 7 Apr. 1993, now U.S. Pat. No. 5,375,393.

BACKGROUND OF THE INVENTION

1. Field of the Invention

This invention relates to the folding of flexible, multi-layer, sheet-like articles, such as bags.

More particularly, the present invention relates to folding vehicular air bags.

In a further and more specific aspect, the present invention concerns a method and apparatus for automated folding of vehicular air bags.

2. The Prior Art

Vehicular air bags are among the latest safety enhancements for automobiles and other vehicles. Their use in vehicles is increasing dramatically. Generally, such air bags are located within a steering wheel or column, dashboard, control panel, or other out-of-the-way location which is near a vehicle's occupant. Sensors located in the vehicle detect when a crash is occurring and activate the air bag(s). When activated, the air bags rapidly inflate between the vehicle's occupant and a potentially injurious or deadly surface, such as a steering wheel. As the crash progresses, the force of the crash may hurl the occupant toward the injurious or deadly surface, but the occupant first encounters the air bag, which prevents or otherwise lessens injury to the occupant.

In order for the air bag to be effective, it must be stored in an out-of-the-way location until needed. Moreover, it must be stored in such a manner that it can be rapidly activated to do its job. Due to the continual down-sizing of vehicles, the out-of-the-way locations where air bags are typically located are usually rather small. Thus, an air bag must be folded into a small package so that it fits into a small location. But, the technique used to fold the air bag affects its deployment when activated. To minimize the possibility of harm to a vehicle occupant, the air bag preferably deploys evenly in a spreading out (side-to-side) manner rather than shooting first toward one side then the other or shooting straight out then filling in from side-to-side.

The conventional process for folding vehicular air bags relies almost exclusively on manual labor. This conventional process is plagued with problems. For example, approximately 12 minutes are required to fold an air bag using manual labor. With the large number of air bags now being used in vehicles, a tremendous amount of labor and expense is required to fold air bags. Moreover, the folding of air bags requires a large number of highly repetitive manual motions. Such repetitive motions are potentially hazardous to the health of the manual laborers. In addition, such repetitive motions lead to boredom, which in turn leads to a poor performance of the job.

Another problem relates to the consistency with which air bags are folded using the conventional process. While some bags get folded acceptably, others tend to be folded using a less-than-optimal folding pattern or in a manner which results in an overly large package. This lack of consistency results in a considerable amount of rework, which is expensive, and inconsistent bag deployment patterns, which may pose unnecessary dangers to vehicle occupants.

Recent innovations have been developed in an attempt to automate the folding of air bags. These innovations have only been partially effective, however, since only a portion of the bag folding process is automated. Generally, the bag folding process can be divided into two main sequences, a horizontal fold sequence and a vertical fold sequence. The horizontal fold sequence forms pleated folds in the sides of the bag which flattens the bag and reduces it to the desired width. The vertical fold sequence folds the flattened bag into the small compact package necessary for installation on a vehicle.

A bag folding system has been developed, which is partially automated, automatically completing the first or horizontal fold sequence of the process. Air bags characteristically have top and bottom sections. The bag folding system clamps the top and bottom sections together. This clamping action occurs near an edge portion of the bag and substantially restricts inflation of the edge portion but leaves a central portion of the bag unclamped. After clamping, the central portion is inflated so that the top section of the air bag separates from the bottom section. When the top and bottom sections have been separated, the clamped edge portion is inserted into the central portion between the top and bottom sections. This system employs horizontal folds, resulting in a flattened air bag having pleated sides. While very effective at completing the horizontal fold sequence, the vertical fold sequence is accomplished manually.

Many air bags are folded to include a bubble fold. This is an extra fold in the air bag which inflates first, and aids in deploying the air bag evenly. At the present time bubble folds are formed manually, requiring an individual to perform numerous repetitions which may result in folding errors, and be potentially hazardous to the health of the manual laborers.

It would be highly advantageous, therefore, to remedy the foregoing and other deficiencies inherent in the prior art.

Accordingly, it is an object of the present invention to provide improvements in folding air bags.

Another object of the present invention is to provide an improved air bag folding system.

And another object of the present invention is to provide an automated system for folding air bags.

Still another object of the present invention is to provide a system for quickly and efficiently folding air bags.

Yet another object of the present invention is to provide a system for uniformly folding air bags.

Yet still another object of the present invention is to provide a system for consistently folding air bags to achieve a desirable deployment pattern.

A further object of the present invention is to provide a system for consistently folding air bags to achieve a small folded-bag profile.

And a further object of the present invention is to provide a system which automatically performs a vertical fold sequence.

Yet a further object of the present invention is to automatically insert an air bag into a retainer with an air bag bubble fold being formed.

SUMMARY OF THE INVENTION

Briefly, to achieve the desired objects of the instant invention in accordance with a preferred embodiment thereof, provided is an apparatus which automatically folds an air bag having pleaded sides, and a bottom end coupled to a retainer. The apparatus includes a holding fixture for receiving the retainer, and a platform for supporting and stretching said bag out from the holding fixture. Also provided are means for forming vertical undulations also referred to as undulating folds along the length of the bag, and means for compressing the undulating folds. An inserter assembly is also provided for inserting the folded bag into the retainer.

The above problems are solved, and the above objects are realized in a method of folding a flattened air bag having pleated sides and an end coupled to a retainer. The method includes forming undulating folds in the flattened bag by inserting the bag sequentially between a series of upright members. The upright members are then removed, and the folds compressed. The folded bag is then inserted into the retainer.

An inserter assembly for packaging an air bag in preparation for deployment is also disclosed, the inserter assembly including a first blade movable between a rearward and a forward position, a second blade independently operable with respect to the first blade, and movable between a raised position and a lowered position, and a blade support movable between a raised and a lowered position, supporting the first blade and the second blade in a substantially parallel relationship. The inserter assembly further includes a first actuator coupling the first blade to the blade support and a second actuator coupling the second blade to the blade support.

Also contemplated is the inserter assembly including a fold panel having a first edge pivotally supported adjacent a lower edge of the retainer, the fold panel movable from a lowered position substantially perpendicular to the retainer, to a raised position substantially parallel to and adjacent the retainer.

The above problems are solved, and the above objects are further realized in a method of packaging an air bag in preparation for deployment.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which:

FIG. 1 is a perspective view of a bag folding system, constructed in accordance with the teachings of the instant invention, as it would appear prior to a first stage in the process for folding an air bag;

FIG. 2 is a perspective view of an inflated air bag;

FIG. 3 is a perspective view of an air bag after horizontal folding has occurred, flattening and forming side pleats in the air bag;

FIG. 4 is a perspective view of a portion of the bag folding system of FIG. 1, with the air bag of FIG. 3 installed in preparation for vertical folding;

FIG. 5A is a perspective view of a portion of the bag folding system of FIG. 1, as it would appear in a first stage of the folding process;

FIG. 5B is a side view of a portion of the bag folding system of FIG. 1, as it would appear after the first stage of the folding process;

FIG. 6 is a perspective view of a portion of the bag folding system of FIG. 1, as it would appear beginning a second stage of the folding process;

FIG. 11 is a perspective view of a portion of the bag folding system of FIG. 1, as it would appear after a third stage of the folding process;

FIG. 12 is a perspective view of a portion of the bag folding system of FIG. 1, as it would appear after a fourth stage of the folding process;

FIG. 13 is a perspective view of a portion of the bag folding system of FIG. 1, as it would appear after a fifth stage of the folding process;

FIG. 14A is a perspective view of a portion of the bag folding system of FIG. 1, as it would appear in a sixth stage of the folding process;

FIG. 14B is a perspective view of a portion of the bag folding system of FIG. 1, as it would appear after the sixth stage of the folding process;

FIG. 15A is a perspective view of a portion of the bag folding system of FIG. 1, as it would appear beginning a seventh stage of the folding process;

FIG. 15B is a perspective view of a portion of the bag folding system of FIG. 1, as it would appear during the seventh stage of the folding process;

FIG. 16 is a perspective view of a portion of the bag folding system of FIG. 1, as it would appear after the seventh stage of the folding process;

FIG. 17 is a perspective view of a portion of the bag folding system of FIG. 1, as it would appear after an eighth stage of the folding process;

FIG. 18 is a perspective view of a portion of the bag folding system of FIG. 1, as it would appear after a ninth stage of the folding process;

FIG. 19 is a perspective view of a portion of the bag folding system of FIG. 1, as it would appear after a tenth stage of the folding process;

FIG. 20 is a perspective view of a portion of the bag folding system of FIG. 1, as it would appear after an eleventh stage of the folding process;

FIG. 21 is a perspective view of a portion of the bag folding system of FIG. 1, as it would appear after a twelfth stage of the folding process;

FIG. 22 is a perspective view of the folded air bag removed from a holding fixture;

FIG. 23 is a front view of a bag folding system, constructed in accordance with the teachings of the instant invention, as it would appear prior to a first stage in the process for folding an air bag;

FIG. 24 is a perspective view of an inflated air bag;

FIG. 25 is a perspective view of an air bag after horizontal folding has occurred, flattening and forming side pleats in the air bag;

FIG. 26 is a perspective view of a portion of the bag folding system of FIG. 23, with the air bag of FIG. 25 installed in preparation for vertical folding;

FIG. 27 is a perspective view of a portion of the bag folding system of FIG. 23, as it would appear in a first stage of the folding process;

FIG. 28 is a perspective view of a portion of the bag folding system of FIG. 23, as it would appear after the first stage of the folding process;

FIG. 29 is a perspective view of a portion of the bag folding system of FIG. 23, as it would appear after the completion of a second stage of the folding process;

FIG. 30 is a perspective view of a portion of the bag folding system of FIG. 23, as it would appear after a third stage of the folding process;

FIG. 31 is a perspective view of a portion of the bag folding system of FIG. 23, as it would appear beginning a fourth stage of the folding process;

FIG. 32 is a perspective view of a portion of the bag folding system of FIG. 23, as it would appear continuing the fourth stage of the folding process;

FIG. 33 is a perspective view of a portion of the bag folding system of FIG. 23, as it would appear continuing the fourth stage of the folding process;

FIG. 34 is a perspective view of a portion of the bag folding system of FIG. 23, as it would appear after the fourth stage of the folding process;

FIG. 35 is a perspective view of a portion of the bag folding system of FIG. 23, as it would appear after a fifth stage of the folding process;

FIG. 40 is a partial perspective view illustrating a further embodiment of an inserter assembly positioned above a rolled air bag prior to insertion of the rolled portion into a retainer;

FIG. 41A is a partial perspective view illustrating the inserter assembly positioned about the rolled portion at the beginning of an insertion cycle;

FIG. 41B is an end view of the inserter assembly at the beginning of an insertion cycle;

FIG. 42A is a partial perspective view illustrating removal of the clamp assembly from engagement with the air bag;

FIG. 42B is an end view of the inserter assembly after removal of the clamping assembly;

FIG. 43 is a partial perspective view of the inserter assembly after movement of the rolled portion toward the retainer and movement of an inner blade to a raised position;

FIG. 44A is a partial perspective view illustrating insertion of the rolled portion into the retainer and the formation of a bubble fold;

FIG. 44B is a side view of the insertion of the rolled portion into the retainer and the formation of a bubble fold;

FIG. 45A is a partial perspective view illustrating the folding of the bubble fold;

FIG. 45B is a side view of the folding of the bubble fold;

FIG. 46 is a partial perspective view illustrating insertion of the bubble fold into the retainer; and FIG. 47 is a partial perspective view illustrating the step of securing the air bag within the retainer.

DETAILED DESCRIPTION OF THE PREFERRED EMBODIMENT

Figure 7:
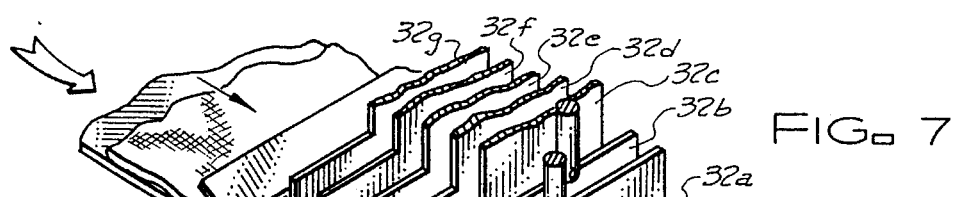
FIG. 7 is a perspective view of a portion of the bag folding system of FIG. 1, as it would appear continuing the second stage of the folding process.

Turning now to the drawings in which like reference characters indicate corresponding elements throughout the several views, attention is first directed to FIG. 1 which illustrates a bag folding machine generally designated by the reference character 10. Bag folding machine 10 consists of a planar base 12 supporting an upper accordion fold assembly 13, a lower accordion fold assembly 14, an inserter assembly 15, a platform 17 and a holding fixture 18. Holding fixture 18 is the focus of the various elements and is rigidly fixed to base 12. Lower accordion fold assembly 14 is carried by base 12 adjacent holding fixture 18. Platform 17 is carried by base 12 adjacent to and slightly elevated above lower accordion fold assembly 14 such that lower accordion fold assembly 14 is positioned between platform 17 and holding fixture 18.

Upper accordion fold assembly 13 includes a carriage 20 which carries a hold down assembly 23, a rotator assembly 24, and a blade assembly 25. Carriage 20 is movable between a rearward and forward position by an actuator (not shown) and guided by guides 22. In FIG. 1, carriage 20 is shown in the rearward position, moved back from lower accordion fold assembly 14. When in the forward position, carriage 20 positions hold down assembly 23 above platform 17, and positions rotator assembly 24 and blade assembly 25 above lower accordion fold assembly 14.

Hold down assembly 23 includes a paddle 27 which is rotatable from an upright position, as shown in FIG. 1, to a lowered position, in which paddle 27 closely overlies platform 17 when carriage 20 is in the forward position. Paddle 27 has a pivot end 28 pivotally coupled to carriage 20, and an opposing end 29 configured to closely overlie contact platform 17. An actuator 30 coupled between paddle 27 and carriage 20 controls the rotation of paddle 27.

Blade assembly 25 includes, in this embodiment, seven upright blades 32. In viewing FIG. 1, each blade 32 is positioned parallel to one another and separately designated 32A–G respectively, beginning at the right hand side and moving to the left. Each of blades 32 are separately movable between a raised position, as shown in FIG. 1, and a lowered position, in which each blade 32 interacts with lower accordion fold assembly 14 when carriage 20 is in the forward position. An actuator 33 is coupled between carriage 20 and each blade 32 respectively for separately moving blades 32 between the raised and lowered positions.

Rotator assembly 24 includes a substantially horizontal arms 34 and 35 extending forwardly from a telescoping cross-piece 37. Cross-piece is positioned rearward of and below blades 32 when they are in the raised position, with arms 34 and 35 extending forwardly to either side of and below the level of blades 32. Cross piece 37 is coupled to carriage 20 by a rotatable spindle 38, not visible in FIG. 1, but can be seen with momentary reference to FIG. 11. Telescoping cross-piece 37 moves arms 34 and 35 between an expanded and a contracted position, actuated by an actuator 39.

Still referring to FIG. 1, lower accordion fold assembly 14 includes a base plate 40 and upright members 42 extending upwardly therefrom. Base plate 40 is movable between a lowered position below the level of platform 17 as shown in FIG. 1, and a raised position where the upper ends of upright members 42 are substantially even with platform 17. Base plate 40 is moved between the lowered and the raised positions by an actuator 43. In this embodiment, six upright members are employed, and each designated by the reference characters 42A–F, respectively, moving from right to left when viewing FIG. 1. A stripper plate 44 is carried above upright members 42, below the level of platform 17. Slots 45 are formed in stripper plate 44, configured to receive upright members 42 when in the raised position.

Inserter assembly 15 includes a carriage 47 which carries a pair of pair of parallel vertical members 48 and 49 and a vertical end plate 50 movable by an actuator 52, between a raised and a lowered position. A horizontal platform blade 53 extends outwardly from carriage 47, positioned below vertical walls 48 and 49, and movable by an actuator 55 between a forward position and a rearward position. Carriage 47 is movable between a rearward and forward position by an actuator (not shown) and guided by guides 54. In FIG. 1, carriage 47 is shown in the rearward position, moved back from holding fixture 18. When in the forward position, carriage 47 positions vertical plates 48 and 49, and end plate 50 over holding fixture 18.

Turning now to FIG. 2, an air bag assembly generally designated 60 is illustrated in an inflated state. Air bag assembly 60 includes a bag retainer 62 secured to a sealed, flexible bag 63. Bag 63 includes a bottom end 64 coupled to retainer 62, and opposing top end 65, a top portion 66, a bottom portion 67, and side portions 68.

As discussed in the background, folding air bag 63 can be divided into two general sequences. The first sequence involves flattening and narrowing bag 63 by using horizontal folds to pleat side portions 68. The second sequence involves folding bag 63 into a compact package which may then be inserted into retainer 62. FIG. 3 illustrates bag assembly 60 after the first sequence has been completed by manual folding as understood by those skilled in the art, or by an automated machine as has been recently developed. Side portions 68 have been pleated with horizontal folds, flattening bag 63 and reducing its width to match the width of retainer 62. In this configuration, top portion 66 overlays bottom portion 67, with end 64 terminating in retainer 62.

Referring now to FIG. 4, bag assembly 63 is positioned within bag folding machine 10. Retainer 62 is received within holding fixture 18, with flattened bag 63 extending over lower accordion fold assembly 14, and supported by platform 17.

Those skilled in the art will appreciate that control means is not shown, but is provided for operating and controlling the various actuators necessary for the operation of machine 10. Those skilled in the art will also appreciate that the precise programming instructions and the nature of the control imparted through the control means and actuators has little bearing on the present invention, other than in accomplishing the below discussed process. For example, while the preferred embodiment of the present invention primarily uses pneumatic actuators, those skilled in the art may adapt hydraulic or solenoid actuators to impart the above discussed movements. Moreover, those skilled in the art will fully appreciate that limit or position switches or sensors may be employed in a conventional fashion within machine 10 to indicate to control means when desired positions are achieved through such movements.

FIGS. 5A through 22 together present various states or stages through which bag folding machine 10 and air bag assembly 60 progress in making vertical folds in air bag 63. As discussed above, FIG. 4 illustrates a portion of machine 10 and bag assembly 60 prior to a first stage in the vertical folding process. Prior to the first stage, bag 63 is supported by platform 17 except for the portion above lower accordion fold assembly 14. The first stage in the vertical fold process is illustrated in FIG. 5A. The first stage results from moving upper accordion fold assembly 13 in a direction indicated by arrowed line A, to its forward position, and moving lower accordion fold assembly 14 in a direction indicated by arrowed line B to its raised position with upright members 42 extending through slots 45 of base plate 40. Included in the first stage is the movement of paddle 27 in a direction indicated by arrowed line C, from a raised position, to a lowered position contacting top portion 66 of bag 63. Arms 34 and 35 of rotator assembly 24 are positioned under bag 63 parallel to and adjacent upright members 42A and 42F. The completed first stage is illustrated in FIG. 5B, with a portion of bag 63 suspended between lower accordion fold assembly 14 and upper accordion fold assembly 13.

FIGS. 6–10 illustrate the second stage of the vertical fold sequence. In the second stage, blades 32 are sequentially stroked downward forcing bag 63 between upright members 42, forming undulating folds along bag 63 consisting of alternating folds 70 between upright members, and 72 over the upper edges of upright members 42. Immediately preceding blades are kept in the lowered position to prevent removal of bag 63 from between upright members when a subsequent blade is stroked downward.

Referring specifically to FIG. 6, blade 32A is stroked downward in a direction indicated by arrowed line D, from its raised position to its lowered position. As blade 32A is stroked downward, bag 63 is forced downward between upright member 42A and arm 34 forming a fold 70. Top end 65 of bag 63 is drawn inward in a direction indicated by arrowed line E as blade 32A forces bag 63 between upright member 42A and arm 34. After blade 32A is lowered, blade 32B is stroked downward from the raised position to the lowered position in the direction of arrowed line F. Blade 32B forces bag 63 between upright members 42A and 42B and over the end of upright member 42A forming fold 72 and a second fold 70. Blade 32A is kept in the lowered position, to act as a hold down preventing removal of bag 63 from between upright members 42A and arm 34 when blade 32B is lowered.

Figure 8:
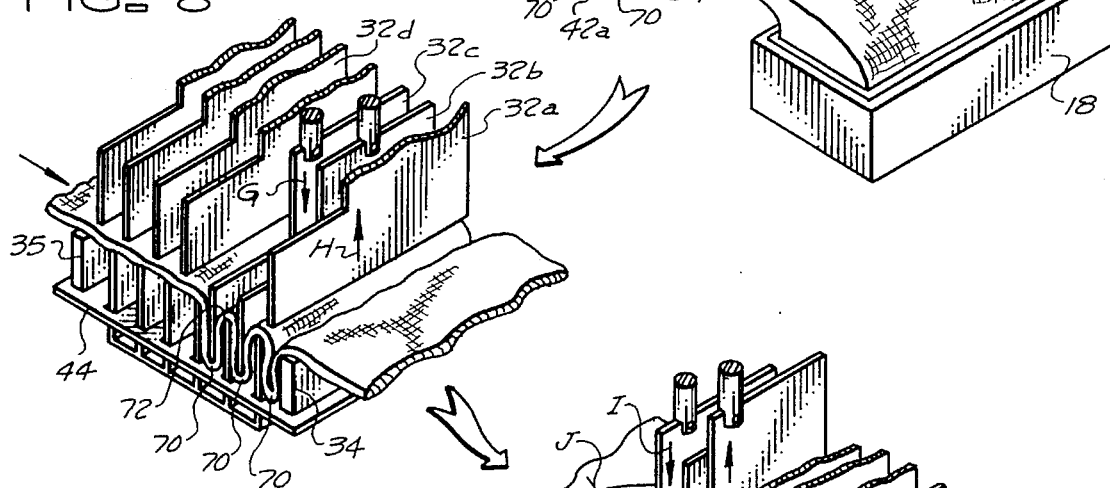
FIG. 8 is a perspective view of a portion of the bag folding system of FIG. 1, as it would appear continuing the second stage of the folding process.
Figure 9:
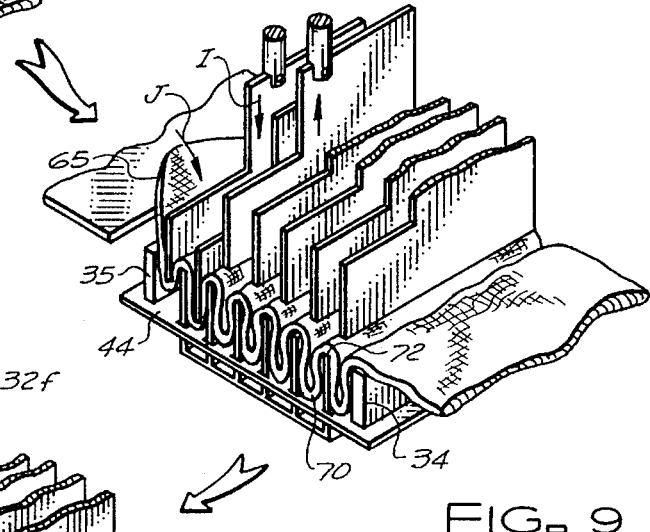
FIG. 9 is a perspective view of a portion of the bag folding system of FIG. 1, as it would appear finishing the second stage of the folding process.

Referring now to FIG. 8, blade 32C is moved in a direction indicated by arrowed line G from a raised to a lowered position, forcing bag 63 downward between upright members 42B and 42C, forming a third fold 70 and second fold 72. At this point blade 32A is stroked upward in a direction indicated by arrowed line H. Blade 32B is retained in the lowered position. This process is continued until each of blades 32 is stroked from the raised to the lowered position, forcing bag 63 between each of upright members 42. FIG. 9 illustrates blade 32G being stroked downward in a direction indicated by arrowed line I forcing bag 63 between upright member 42F and arm 35. At this point, top end 65 of bag 63 moves off platform 17 in a direction indicated by arrowed line J.

Figure 10:
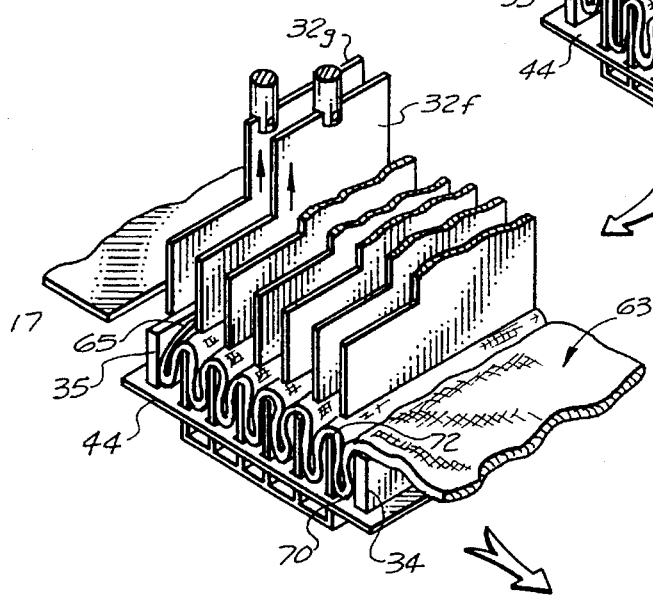
FIG. 10 is a perspective view of a portion of the bag folding system of FIG. 1, as it would appear after the second stage of the folding process.

Referring now to FIG. 10, blades 32 have all been moved upward to the raised position, with bag 63 forced between each of the upright members 42 forming a plurality of folds 70 and 72.

FIG. 11 illustrates the third stage of the vertical fold sequence, immediately following the second stage. Blade assembly 25 is not illustrated in order that an unobstructed view of bag 63 is provided. Stage three consists of base plate 40 and upright member 42 being stroked downward in a direction indicated by arrowed line K removing upright members 42 from slots 45 of stripper plate 44 without disturbing folds 70 and 72 of bag 63. Vertical folds 70 and 72 are now maintained by arms 34 and 35 of rotator assembly 24.

Stage four is illustrated in FIG. 12 and immediately follows stage three. Stage four consists of moving arm 35 in a direction indicated by arrowed line L, from the expanded position to the contracted position. This stage compacts folds 70 and 72, and securely retains bag 63 between arms 34 and 35.

The fifth stage in the vertical fold sequence is illustrated in FIG. 13 and immediately follows the fourth stage. During the fifth stage, platform blade 53 is moved in a direction indicated by arrowed line M from a rearward position to the forward position closely overlying holding fixture 18.

In viewing FIGS. 14A and B, the sixth stage consists of rotating spindle 38 in a clockwise direction, indicated by curved arrow N, thereby rotating arms 34 and 35 and bag 63 contained therebetween in a direction indicated by arcuate arrow O. FIG. 14B illustrates rotator assembly 24 after a complete 360 degree revolution. The revolution is completed with arms 34 and 35 positioning bag 63 above platform blade 53.

A seventh stage of the vertical fold sequence is illustrated in FIGS. 15A and 15B, and consists of placing a compression plate 69 above bag 63 between arms 34 and 35. Compression plate 69 has dimensions corresponding to the dimensions of retainer 62. Referring now to FIG. 15B, vertical members 48 and 49 and end plate 50 are stroked downward in a direction indicated by arrowed line P.

The seventh stage is completed by the removal of arms 34 and 35 as illustrated in FIG. 16. Arms 34 and 35 are moved in a direction indicated by arrowed line Q permitting vertical members 48 and 49 to be moved in the direction of arrowed lines R and S respectively. This step may be accomplished in a wide variety of manners, but is illustrated as being biased inward by coil springs 73 and 74.

An eighth stage of the vertical fold sequence is illustrated in FIG. 17. Bag 63 is supported above retainer 62 by platform bag 53, and vertical members 48 and 49 are compressed inward along arrowed line R and S tightly compacting folds 70 and 72 of bag 63. This may be accomplished by the use of any compressive force, but is preferably accomplished by using actuators 77 and 78 as shown in FIG. 17.

A ninth stage of the vertical fold sequence is illustrated in FIG. 18, and consists of stroking platform blade 53 in a rearward direction indicated by arrowed line T. Bag 63 is now supported above retainer 62 by vertical members 48 and 49. A tenth stage is illustrated in FIG. 19 and includes lowering vertical members 48 and 49 in a direction indicated by arrowed lines U, and lowering compression plate 69 in a direction indicated by arrowed line V. The combination of vertical members 48 and 49 and compression plate 69 forces bag 63 into retainer 62. Vertical members 48 and 49 and end plate 50 are then stroked upward in a direction indicated by arrowed lines W as illustrated in FIG. 20. Compression plate 69 is then removed leaving a compactly folded bag 63 housed in retainer 62. Retainer 62 is then removed from holding fixture 18 for installation in a vehicle.

Turning now to FIG. 23, another embodiment of a bag folding machine generally designated 110 is illustrated. Bag folding machine 110 consists of a planar base 112 supporting an upper accordion fold assembly 113, a lower accordion fold assembly 114, an inserter assembly 115, spaced apart, generally horizontal platforms 117 and a holding fixture 118. Holding fixture 118 is the focus of the various elements, and is rigidly fixed to base 112. Lower accordion fold assembly 114 is divided into two spaced apart components, which for purposes of reference are designated right lower accordion fold assembly 114A carried by base 112 to the right of and adjacent to holding fixture 118, left lower accordion fold assembly and 114B carried by base 112 to the left of and adjacent to holding fixture 118. Platform 117 is also separated into two sections, which for purposes of reference are designated platform 117A carried slightly elevated with respect to and to the right of assembly 114A, and platform 117B carried slightly elevated with respect to and to the left of component 114B.

Upper accordion fold assembly 113 includes a carriage 120 which carries a hold down assembly 123, and a blade assembly 125. Hold down assembly 123 is not illustrated in FIG. 23, but can be seen with additional reference to FIG. 29. For purposes of reference, holding down assembly 123 is divided into a left portion 123A mounted to the left side of carriage 120 and a right portion 123B mounted to the right side of carriage 120. Portions 123A and 123B each include a paddle 127A and 127B respectively which is rotatable from an upright position, to a lowered position, in which paddles 27A and 27B closely overlie platforms 117A and 117B.

Blade assembly 125, for purposes of reference, is separated into blade assemblies 125A configured to interact with lower component 114A, and blade assembly 125B configured to interact with lower component 114B. Carriage 120 is movable between a rearward and a forward position by an actuator, not shown. In the forward position, carriage 120 positions hold down assembly 123A and 123B above platform 117A and 117B respectively, and blade assembly 125A and 125B above lower accordion assemblies 114A and 114B respectively.

Blade assembly 125A includes, in this embodiment, three upright blades 132. In viewing FIG. 23, each blade 132 is positioned parallel to one another and separately designated 132A–C respectively, beginning at the left hand side and moving to the right. Each of blades 132 are separately movable between a raised position, as shown in FIG. 123, and a lowered position, in which each blade 132 interacts with lower accordion fold assembly 114A when carriage 120 is in the forward position. An actuator 133 is coupled between carriage 120 and each blade 132 respectively for separately moving blades 132 between the raised and lowered positions. Blade assembly 125B includes, in this embodiment, five upright blades 134, each designated 134A–E respectively beginning at the right hand side and moving to the left when viewing FIG. 23. Each of blades 134 is separately movable between a raised position, as shown in FIG. 23, and a lowered position, in which each blade 134 interacts with lower accordion fold assembly 114B when carriage 120 is in the forward position. An actuator 135 is coupled between carriage 120 and each blade 134 respectively for separately moving blades 134 between the raised and lowered positions.

Inserter assembly 115 is mounted to carriage 120 intermediate blade assemblies 125A and 125B, positioned above holding fixture 118. Inserter assembly 115 consists of a compression plate 136 movable between a raised position and a lowered position closely overlying holding fixture 118, by an actuator 137. A center blade 138 extends down centrally through compression plate 136, and is movable between a raised position, and a lowered position by an actuator 139. Inserter assembly 115 further includes a compression member 148 mounted to the right of lower accordion fold assembly 114A and a compression member 149 mounted to the left of lower accordion fold assembly 114B. Compression members 148 and 149 are movable inward toward holding fixture 118 by actuators 150 and 152 respectively.

Still referring to FIG. 23, lower accordion fold assembly 114A includes a base plate 140A and upright members 142 extending upwardly therefrom. Base plate 140A is movable between a lowered position below the level of platform 117A and a raised position, as shown in FIG. 23, where the upper ends of upright members 142 are substantially even with platform 117A. Base plate 140A is moved between the lowered and the raised positions by an actuator 143A. In this embodiment, four upright members are employed, and designated by the reference characters 142A–D beginning from the left hand side and moving towards the right when viewing FIG. 23. A stripper plate 144A is carried above uprights 142, below the level of platform 117A. Slots 145A are formed in stripper plate 144A, configured to receive upright members 142 when in the raised position.

Lower accordion fold assembly 114B includes a base plate 140B and upright members 146 extending upwardly therefrom. Base plate 140B is movable between a lowered position below the level of platform 117B and a raised position where the upper ends of upright members 146 are substantially even with platform 117B. Base plate 140B is moved between the lowered and the raised positions by an actuator 143B. In this embodiment, six upright members are employed, and designated by the reference characters 146A–F, beginning from the right hand side and moving towards the left when viewing FIG. 23. A stripper plate 144B is carried above uprights 146, below the level of platform 117B. Slots 145B are formed in stripper 144B, configured to receive uprights 146 when in the raised position.

Turning now to FIG. 24, an air bag assembly generally designated 160 is illustrated in an inflated state. Air bag assembly 160 includes a bag retainer 162 secured to a sealed, flexible bag 163. Bag 163 includes a bottom end 164 coupled to retainer 162, an opposing top section 165, and side portions 168.

As discussed in the background and earlier in the description of the first embodiment, folding air bag 163 can be divided into two sequences. The first sequence involves flattening and narrowing bag 163 by using horizontal folds to pleat side portions 168. The second sequence involves folding bag 163 into a compact package which may then be inserted into retainer 162. FIG. 25 illustrates bag assembly 160 after the first sequence has been completed by manual folding as understood by those skilled in the art or by an automated machine as has been recently developed. Side portions 168 have been pleated with horizontal folds, flattening bag 163 such that top portion 165 overlies bottom end 164, and reducing its width to match the width of retainer 162. This configuration, as viewed horizontally, includes a right end 169A and a left end 169B.

Those skilled in the art will appreciate that control means is provided for operating and controlling the various actuators necessary for the operation of machine 110. Those skilled in the art will also appreciate that precise programming instructions and the nature of the control imparted through the control means and actuators has little bearing on the present invention, other than in accomplishing the below discussed process. For example, while the preferred embodiment of the present invention primarily used pneumatic actuators, those skilled in the art may adapt hydraulic or solenoid to impart the above discussed movements. Moreover, those skilled in the art will fully appreciate that limit or position switches or sensors may be employed in a conventional fashion within machine 110 to indicate to control means when desired positions are achieved through such movements.

Referring now to FIG. 26, bag assembly 163 is positioned within bag folding machine 110. Retainer 162 is received within holding fixture 118, with right end 169A of flattened bag 163 extending over lower accordion fold assembly 114A, and supported by platform 117A, and left end 169B of flattened bag 163 extending over lower accordion fold assembly 114B, and supported by platform 117B.

FIGS. 27–39 together present various states or stages through which bag folding machine 110 and air bag assembly 160 progress in making vertical folds in air bag 163. As discussed above, FIG. 26 illustrates a portion of machine 110 and bag assembly 160 prior to a first stage in the vertical folding process. Prior to the first stage, bag 163 is supported by platform 117A and 117B except for the central portion above lower accordion fold assemblies 114A and 114B. The first stage in the vertical fold process is illustrated in FIG. 27, and consists of stroking lower accordion fold assemblies 114A and 114B upward in a direction indicated by arrowed lines AA. This brings the upper edges of upright members 142 and 146 substantially even with platforms 117A and 117B. As illustrated in FIG. 28, the first stage is completed by moving upper accordion fold assembly 113 forward in a direction indicated by arrowed lines BB such that upper accordion fold assembly 113A closely overlies right end 169A of air bag 163, positioned above lower accordion fold assembly 114A, upper accordion fold assembly 113B closely overlies left end 169B of air bag 163, positioned above lower accordion fold assembly 114B, and inserter assembly 115 is positioned above holding fixture 118.

A second stage of the vertical fold sequence is illustrated in FIG. 29 wherein paddles 127A and 127B are moved in a direction indicated by arrowed line CC from a raised position to a lowered position contacting right end 169A and left end 169B of bag 163 respectively.

A third stage of the vertical folding sequence is illustrated in FIG. 30 and consists of moving center blade 138 of inserter assembly 115 in a direction indicated by arrowed line DD, from the raised position to the lowered position, inserting top portion 165 of air bag 163 into retainer 162. Center blade 138 is kept in the lowered position to act as a hold down preventing subsequent unintentional removal of top portion 165 from retainer 162.

A fourth stage of the vertical folding sequence is illustrated in FIGS. 31–34 in which undulations, also referred to as undulating folds are formed along bag 63. Blade assembly 125A is actuated first, in this preferred embodiment, with blades 132 being stroked from the raised position to the lowered position in sequence beginning with blade 132A as shown in FIG. 31. Blade 132A forces air bag 163 downward between upright members 142A and 142B forming a fold 170 adjacent stripper panel 144A. As air bag 163 is inserted between upright members 142, right end 169A moves inward in a direction indicated by arrowed line EE. FIG. 32 illustrates the sequential movement of first blade 132B, then 132C stroked downward forcing bag 163 downward between upright members 142, forming additional folds 172 over the upper edges of upright members 142.

After the formation of folds 170 and 172 in right end 169A, each of blades 134 of blade assembly 125B, is stroked downward in sequence beginning with blade 134A. As each blade is stroked downward in sequence, folds 170 are formed between upright members 146 and folds 172 are formed over the ends of upright members 146. Referring to FIG. 33, the immediately preceding blade 134 remains in a downward stroked position to act as a hold down for air bag 163 during the subsequent downward stroke of the next blade 134 in sequence.

The completion of stage four is illustrated in FIG. 34. The completion of stage four consists of moving the final blades acting as hold down blades, which in this embodiment are blades 132A and 134E, in an upward direction designated by arrowed line FF. Bag 163 has now been forced between each of the upright members 142 and 146, forming a plurality of folds 70 and 72.

Figure 36:
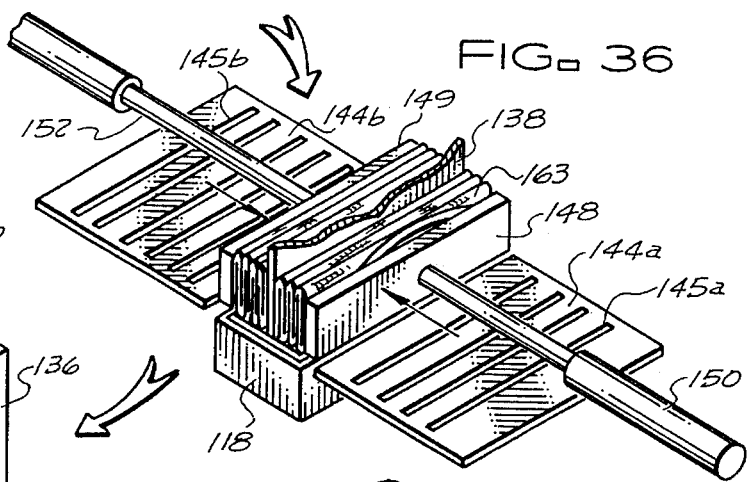
FIG. 36 is a perspective view of a portion of the bag folding system of FIG. 23, as it would appear after a sixth stage of the folding process.

A fifth stage of the vertical fold sequence is illustrated in FIG. 35 and immediately follows the fourth stage. Upper accordion fold assembly 113 is not visible, in order that an unobstructed view of bag 163 is provided. Stage five consists of base plate 140A with upright members 142 and base plate 140B with upright members 146 being stroked downward in a direction indicated by arrowed lines GG, removing upright members 142 and 146 from slots 145A and slots 145B of stripper plate 144A and 144B respectively, without disturbing folds 170 and 172 of bag 163. Vertical folds 170 and 172 are now maintained upon stripper plates 144A and 144B by compression members 148 and 149 respectively. A sixth stage of the folding sequence immediately following the fifth stage, is illustrated in FIG. 36. Compression members 148 and 149 are moved inward compressing folds 170 and 172 of bag 163. Bag 163 is compressed about center blade 138, to a size receivable within retainer 162.

Figure 37A:
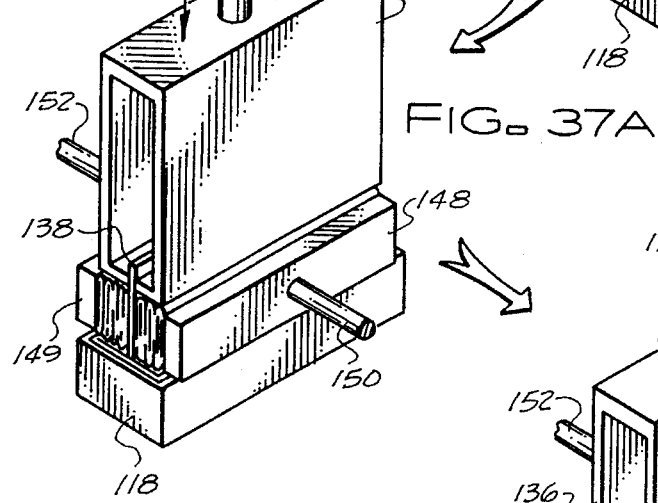
FIG. 37A is a perspective view of a portion of the bag folding system of FIG. 23, as it would appear in a seventh stage of the folding process.
Figure 37B:
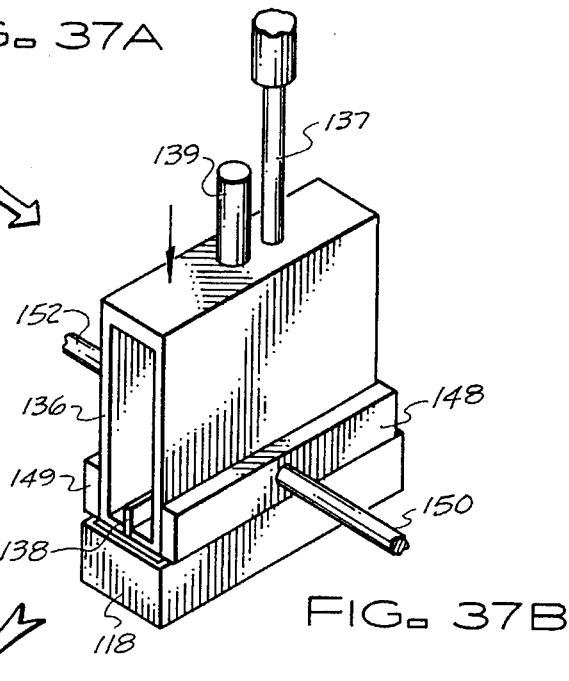
FIG. 37B is a perspective view of a portion of the bag folding system of FIG. 23, as it would appear after the seventh stage of the folding process.

A seventh stage immediately following the sixth stage is illustrated in FIGS. 37A and 37B. In the seventh stage, compression plate 136 is moved in a downward direction indicated by arrowed line HH. Compression plate 136 contacts bag 163 and forces it from between compression members 148 and 149 downward into retainer 162 as illustrated in 37B.

Figure 38:
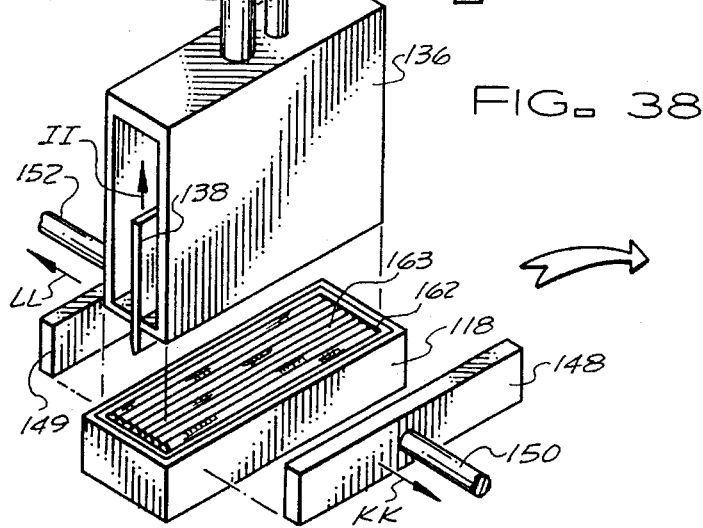
FIG. 38 is a perspective view of a portion of the bag folding system of FIG. 23, as it would appear after an eighth stage of the folding process.
Figure 39:
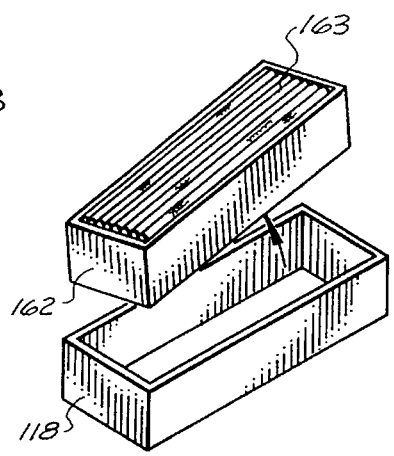
FIG. 39 is a perspective view of the folded air bag removed from a holding fixture.

An eighth stage of the folding sequence immediately following the seventh stage is illustrated in FIG. 38. In the eighth stage, center blade 138 is moved upward in a direction indicated by arrowed line II, compression plate 136 is moved upward in a direction indicated by arrowed line JJ, upper accordion fold assembly 113 is moved rearward removing the assembly from above holding fixture 118 and compression members 148 and 149 are moved in a direction indicated by arrowed lines KK and LL respectively.

The final stage in the folding sequence is illustrated in 39, and consists in removing retainer 162 containing folded air bag 163 from holding fixture 118.

A further embodiment of an inserter assembly generally designated 200 and a cycle of inserting an air bag 202 into a retainer 203 is illustrated in FIGS. 40–47. Inserter assembly 200 automatically packages air bag 202 in preparation for deployment, by inserting air bag 202 into retainer 203 in such a manner as to form a fold therein, often referred to as a bubble or bubble fold. A bubble fold is known in the art, and employed to aid in the uniform inflation of air bag 202. Air bag 202 is coupled to retainer 203 which is held securely in a holding fixture 204. One skilled in the art will understand that air bag 202 may be compacted in substantially any manner such as being folded by bag folding machine 10 as illustrated in FIGS. 1–14, with insertion of the folded air bag accomplished by inserter assembly 200 replacing inserter assembly 15. To represent the diverse uses of inserter assembly 200, however, air bag 202 is illustrated as having been rolled in a conventional manner, well known to those skilled in the art. A clamp assembly 205 consisting of opposing clamp members 207 and 208 clamp an end 209 of air bag 202. Clamp assembly 205 is rotated in the direction indicated by arcuate arrowed line MM, rolling air bag 202 around clamp members 207 and 208 to form a rolled portion 210. Air bag 202 is rolled to a point proximate retainer 203, with rolled portion 210 coupled to retainer 203 by a coupling portion 211, as shown in FIG. 40. Clamp assembly 205 and the rolling procedure are not shown in detail as they are well known in the art and included for purposes of reference and orientation.

Inserter assembly 200 is carried on a movable carriage (not shown) which moves inserter assembly 200 inward and outward, between a forward position and rearward position. The terms inward and outward as used here, refer to a direction toward holding fixture 204 and away from holding fixture 204, respectively. Inserter assembly 200 consists of a blade support 212 movable between a raised position and a lowered position by an actuator 213. Blade support 212 has an inner end 214 and an outer end 215. Inner end 214 supports an inner blade 217 and outer end 215 supports an outer blade 218 substantially parallel to and spaced from inner blade 217. A gate panel 223 is coupled to an edge of inner blade 217 and spans the distance between inner blade 217 and outer blade 218 at one end. A slot 224 is formed through the lower end of gate panel 223, the purpose of which will be described below. Inner blade 217 and outer blade 218 are independently movable by actuators 219 and 220 respectively. Actuator 219 couples inner blade 217 to inner end 214, movable between a raised position and a lowered position with respect to blade support 212. Actuator 220 couples outer blade 218 to a drop member 222 extending downward from outer end 215. Drop member 222 positions outer blade 218 at substantially the same level as inner blade 217 when inner blade 217 is in the lowered position. Actuator 220 moves outer blade 218 in an inward direction and in an outward direction, between a rearward position and a forward position with respect to blade support 212.

A first stage of the insertion cycle, consisting of positioning inserter assembly 200, is illustrated in FIG. 40. Actuator 213 is operated, moving blade support 212 downward to the lowered position, in a direction indicated by arrowed lines NN. Inner blade 217 is in the lowered position between rolled portion 210 and holding fixture 204, and outer blade 218 is in the rearward position. As can be seen with reference to FIGS. 41A and 41B, inner blade 217 and outer blade 218 are positioned above the lowest edge of holding fixture 204 and retainer 203. Gate portion 223 is received about clamp assembly 205, with clamp members 207 and 208 extending through slot 224.

A second stage of the insertion cycle, consisting of removing clamp assembly 205, is illustrated in FIGS. 41A–42B. Referring first to FIGS. 41A and 41B, inner blade 217 and outer blade 218 are positioned on opposing sides of rolled portion 210 after the first stage. Outer blade 218 is moved inward, towards inner blade 217 in a direction indicated by arrowed line OO by actuator 220, compressing rolled portion 210 against inner blade 217. Gate panel 223 is illustrated broken away from inner blade 217 to provide a clear view of slot 224.

FIGS. 42A and 42B illustrate the removal of clamp assembly 205 from rolled portion 210. Clamping members 207 and 208 are extracted from rolled portion 210 in a direction indicated by arrowed line PP. Gate panel 223 permits extraction of clamping members 207 and 208 through slot 224, while preventing skewing of air bag 202. Slot 224 is sized to permit free movement of clamp members 207 and 208 while preventing air bag 202 from being drawn along therewith and distorting rolled portion 210.

A third stage of the insertion cycle, consisting of forming a bubble fold, is illustrated beginning in FIGS. 42A and 42B and continuing in FIGS. 43–44B. After removal of clamp assembly 205, inserter assembly 200 is moved inward in a direction indicated by arrowed lines QQ, towards retainer holding fixture 204, to the forward position. In the forward position, inner blade 217 resides adjacent holding fixture 204 as can be seen with additional reference to FIG. 43.

As inserter assembly 200 is moved inward to the forward position, a fold of material is passed over and left behind. In the lowered position, as described previously, inner blade 217 and outer blade 218 are positioned above the lowest portion of retainer 203, resulting in rolled portion 210 being moved over coupling portion 211 of air bag 202. The fold formed in coupling portion 211 of air bag 202 is the beginnings of a bubble fold 225 which extends outward from retainer 203 and passes underneath rolled portion 210.

After inserter assembly 200 is moved inward to the forward position, actuator 219 is operated to move inner blade 217 in an upward direction as indicated by arrowed line RR, to the raised position. As actuator 219 raises inner blade 217, outer blade 218 is moved inward by actuator 220. As inner blade 217 clears an upper edge of holding fixture 204 and retainer 203, outer blade 218 pushes rolled portion 210 of air bag 202 into retainer 203 as can be seen in FIGS. 44A and 44B. As rolled portion 210 is pushed, it moves over coupling portion 211, enlarging the fold left behind and thereby forming bubble fold 225. Bubble fold 225 extends outward from retainer 203 substantially the same distance as the width of retainer 203. A retaining cover 227 can be seen extending from retainer 203 under bubble fold 225. Retaining cover 227 has an outer edge 226 which is affixable to retainer 203 for purposes which will be described below.

Inserter assembly 200 further includes a fold plate 228 having an outer edge 229 and a pivot edge 230. Pivot edge 230 is pivotally coupled to a support (not shown), proximate the lower edge of holding fixture 204. An actuator 232 pivots fold plate 228 about pivot edge 230 in a direction indicated by arcuate arrowed line SS, from a lowered position to a raised position. In the raised position outer edge 229 of fold plate 228 is positioned adjacent the upper edge of holding fixture 204. As with the previous actuators, actuator 232 is preferably a double acting cylinder, and has an end 233 pivotally coupled to fold plate 228.

A fourth stage of the insertion cycle, consisting of inserting bubble fold 225 into retainer 203, is illustrated in FIGS. 45A–46. As can be seen in FIGS. 45A and 45B, actuator 232 is operated, pivoting fold plate 228 to the raised position. Fold plate 228 carries bubble fold 225 and retaining cover 227 upward as it pivots about pivot edge 230. Outer edge 229 is angled upward to aid in guiding bubble fold 225 into retainer 203. As fold plate 228 folds bubble fold 225 upward prior to insertion into retainer 203, outer plate 218 is moved upward in a direction indicated by arrowed line TT. The removal of outer plate 218 permits fold plate 228 to force bubble fold 225 into retainer 203. When fold plate 228 reaches the fully raised position as shown in FIG. 46, bubble fold 225 is fully inserted into retainer 203.

The final stage of the insertion cycle is affixing outer edge 226 of retaining cover 227 to retainer 203. At this stage, fold plate 228 is also rotated back to the lowered position to allow access to retaining cover 227. One skilled in the art will understand that numerous means are available for affixing outer edge 226 to retainer 203, including but not limited to an adhesive strip 234. Retaining cover 227 holds air bag 202 within retainer 203 until inflation is required, and preferably consists of a rupturable or frangible material such as is manufactured by DuPont under the trade name TYVEK.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of automatically packaging an air bag for deployment, said method comprising the steps of:

providing said air bag including a first end coupled to a retainer, a second end in a compacted state, and a coupling portion coupling said second end to said first end;

forming a bubble fold in said coupling portion;

inserting said second end into said retainer;

inserting said bubble fold into said retainer; and securing said air bag within said retainer.

2. A method as claimed in claim 1 wherein the step of forming said bubble fold includes the step of moving said second end over said coupling portion toward said retainer.

3. A method as claimed in claim 2 wherein the step of moving said second end over said coupling portion includes the steps of:

providing a first blade movable between a rearward and a forward position;

providing a second blade independently operable with respect to said first blade, and movable between a raised position and a lowered position;

providing a movable blade support, supporting said first blade and said second blade in a substantially parallel relationship;

positioning said first blade and said second blade on opposing sides of said second end of said air bag; and moving said blade support towards said retainer.

4. A method as claimed in claim 3 wherein the step of inserting said second end includes:

raising said second blade; and moving said first blade to said forward position.

5. A method as claimed in claim 4 wherein the step of inserting said bubble fold includes the steps of:

providing a fold panel pivotally movable from a lowered position to a raised position;

moving said fold panel to said raised position; and raising said first plate.

6. A method as claimed in claim 5 wherein the step of securing said air bag within said retainer includes the steps of:

providing a retaining cover coupled at a first edge to said retainer and having an opposing second edge;

covering said air bag with said retaining cover; and affixing said second edge to said retainer.

7. An inserter assembly for packaging an air bag in preparation for deployment, said inserter assembly comprising:

a first blade movable between a rearward and a forward position;

a second blade independently operable with respect to said first blade, and movable between a raised position and a lowered position; and a blade support movable between a raised and a lowered position, supporting said first blade and said second blade in a substantially parallel relationship.

8. An inserter assembly as claimed in claim 7 further including:

a first actuator coupling said first blade to said blade support; and a second actuator coupling said second blade to said blade support.

9. An inserter assembly as claimed in claim 8 further including a fold panel having a first edge pivotally supported adjacent a lower edge of said retainer, said fold panel movable from a lowered position substantially perpendicular to said retainer to a raised position substantially parallel to and adjacent said retainer.

* * * * *